(12) United States Patent
Lehmann

(10) Patent No.: US 9,789,943 B2
(45) Date of Patent: Oct. 17, 2017

(54) ARRANGEMENT FOR MULTI SCREW VESSELS COMPRISING EXTERNAL PROPELLER SHAFTS AS WELL AS METHOD FOR PRODUCING SUCH AN ARRANGEMENT

(71) Applicant: Becker marine systems GmbH & Co. KG, Hamburg (DE)

(72) Inventor: Dirk Lehmann, Winsen / Luhe (DE)

(73) Assignee: Becker marine systems GmbH & Co. KG, Hamburg (DE)

( * ) Notice: Subject to any disclaimer, the term of this patent is extended or adjusted under 35 U.S.C. 154(b) by 0 days.

(21) Appl. No.: 15/058,454

(22) Filed: Mar. 2, 2016

(65) Prior Publication Data

US 2016/0280346 A1    Sep. 29, 2016

(30) Foreign Application Priority Data

Mar. 6, 2015    (DE) .................. 10 2015 103 285

(51) Int. Cl.
| | | |
|---|---|---|
| *B63B 3/42* | (2006.01) | |
| *B63H 1/28* | (2006.01) | |
| *B63H 5/08* | (2006.01) | |
| *B63H 5/16* | (2006.01) | |
| *B63H 25/42* | (2006.01) | |

(52) U.S. Cl.
CPC .............. *B63H 1/28* (2013.01); *B63B 3/42* (2013.01); *B63H 5/08* (2013.01); *B63H 5/16* (2013.01); *B63H 5/165* (2013.01); *B63H 25/42* (2013.01); *B63B 2003/425* (2013.01); *B63H 2001/283* (2013.01); *Y02T 70/14* (2013.01)

(58) Field of Classification Search
CPC .................... B63H 1/28; B63B 3/42

USPC .......................................... 440/51
See application file for complete search history.

(56) References Cited

U.S. PATENT DOCUMENTS

| | | | | |
|---|---|---|---|---|
| 1,801,875 | A * | 4/1931 | Melcher ................ | B63B 1/08 114/57 |
| 4,804,312 | A * | 2/1989 | Schneekluth ........... | B63H 5/08 415/208.1 |
| 7,798,875 | B1 * | 9/2010 | Angel ..................... | B63B 3/42 440/82 |
| 8,356,566 | B1 * | 1/2013 | Sellins ................... | B63H 25/48 114/166 |
| 8,944,869 | B2 * | 2/2015 | Lehmann ................ | B63H 1/28 440/66 |

(Continued)

FOREIGN PATENT DOCUMENTS

| | | | |
|---|---|---|---|
| DE | 606 019 C | 11/1934 | |
| DE | 606019 C | * 11/1934 | ............. B63B 3/42 |

(Continued)

OTHER PUBLICATIONS

European Search Report for the European Patent Application No. EP16157555.0 dated Aug. 9, 2016.

*Primary Examiner* — Lars A Olson
*Assistant Examiner* — Jovon Hayes
(74) *Attorney, Agent, or Firm* — Kelly & Kelley, LLP

(57) ABSTRACT

The invention relates to an arrangement for multi screw vessels, in particular twin screw vessels, with external propeller shafts, as well as to a method for producing such an arrangement. The arrangement according to the invention is in particular suitable for a drive system of an above-mentioned multi screw vessel and to improve the energy efficiency thereof.

20 Claims, 13 Drawing Sheets

(56) References Cited

U.S. PATENT DOCUMENTS

| | | | | |
|---|---|---|---|---|
| 2006/0166570 A1* | 7/2006 | Norman | ................ | B63H 20/00 |
| | | | | 440/66 |
| 2016/0090163 A1* | 3/2016 | Lehmann | ................ | B63H 1/28 |
| | | | | 415/146 |
| 2016/0280346 A1* | 9/2016 | Lehmann | ................ | B63B 3/42 |

FOREIGN PATENT DOCUMENTS

| | | |
|---|---|---|
| DE | 36 33 689 C1 | 2/1988 |
| DE | 267 383 A3 | 5/1989 |
| DE | 20 2009 009 899 U1 | 12/2010 |
| DE | 20 2013 101 943 U1 | 6/2013 |
| EP | 2 277 772 B1 | 5/2012 |
| EP | 2 492 185 A1 | 8/2012 |
| JP | S59-202991 | 11/1984 |

\* cited by examiner

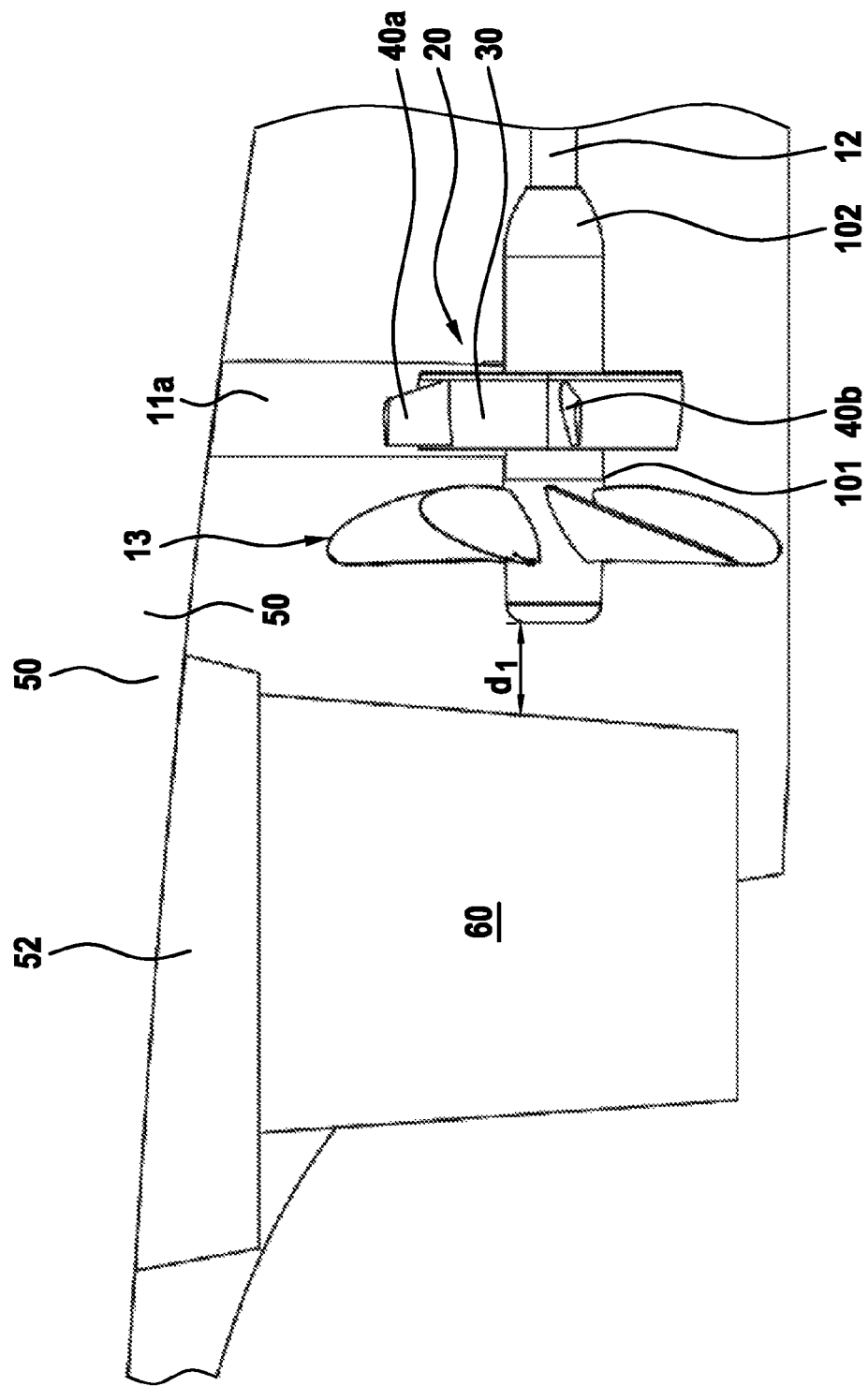

ARRANGEMENT FOR MULTI SCREW VESSELS COMPRISING EXTERNAL PROPELLER SHAFTS AS WELL AS METHOD FOR PRODUCING SUCH AN ARRANGEMENT

FIELD OF INVENTION

The invention relates to an arrangement for multi screw vessels, in particular twin screw vessels, with external propeller shafts, as well as to a method for producing such an arrangement. The arrangement according to the invention is in particular suitable for a drive system of an aforementioned multi screw vessel and to improve the energy efficiency thereof.

BACKGROUND OF THE INVENTION

Several devices are known from the prior art for reducing the drive power requirement of single screw vessels. EP 2 100 808 A1 is mentioned in an exemplary manner here.

In the case of normal single screw vessels, the propeller shaft of the vessel's propeller runs inside the vessel's hull. In the case of these vessels, only the end of the propeller shaft protrudes from the vessel's hull, wherein the ship screw is attached to the protruding end of the propeller shaft. In contrast, several types of vessels are equipped as multi screw vessels, that is, with at least two ship screws or at least two ship propellers, respectively. In particular, twin screw vessels are known, which have two ship screws or ship propellers, respectively. A vessel type, which can often be found in the case of multi screw vessels, is a multi screw vessel with exterior propeller shafts. In the case of this vessel type, the at least two propeller shafts are arranged at least partially outside of the vessel's hull. In the case of this vessel type normally a significant part of the respective propeller shafts is arranged externally. For example, the propeller shaft can also be arranged externally at least 1 m, preferably also at least 3 m, often at a length of 5 m or more. Usually the external section of the propeller shafts is thereby only sheathed by a pipe or the like and is spatially spaced apart from the vessel's hull. Usually each external part of the propeller shafts is supported via a shaft bracket, wherein the shaft bracket is connected to the vessel's hull via shaft bracket arms. The shaft bracket is normally arranged at the end region of the propeller shafts, so that the propeller of the vessel is attached to the propeller shaft in longitudinal direction of the propeller shaft, just behind the shaft bracket. Often each external propeller shaft is supported by means of exactly one shaft bracket.

Devices for improving the energy efficiency or for reducing the drive power requirement, respectively, are not known for such a vessel type of a multi screw vessel with external propeller shafts.

SUMMARY OF THE INVENTION

Accordingly, it is the object of the present invention to specify an arrangement for multi screw vessels with external propeller shafts, by means of which the drive power requirement of these multi screw vessels can be reduced.

This object is solved by means of an arrangement for multi screw vessels, in particular twin screw vessels, with external propeller shafts, comprising at least two shaft brackets for supporting the propeller shafts, wherein each of the at least two shaft brackets has at least one shaft bracket arm, preferably at least two shaft bracket arms, for fastening the respective shaft bracket to the multi screw vessel, as well as at least two devices for reducing the drive power requirement of the multi screw vessels, wherein each device is assigned to a shaft bracket, and wherein each of the at least two devices comprises at least one hydrofoil. In the case of the arrangement, at least one shaft bracket arm of each shaft bracket is furthermore formed as a hydrofoil of the device, wherein, in addition to the shaft bracket arms, no further hydrofoils are provided, or each of the at least two devices of the arrangement comprises a fore-nozzle, wherein, in the case of each of the at least two devices, at least one fin each is provided, which is formed as a hydrofoil of the device, wherein the at least one fin is arranged in the interior of the fore-nozzle and/or on the outside of the fore-nozzle.

The shaft brackets are arranged on the external (that is, located outside of the hull) part of the respective propeller shaft, so as to brace or mount, respectively, and/or to seat the latter. Each shaft bracket is connected to the vessel's hull via one, preferably via two or more shaft bracket arms. The shaft bracket arms have the function of a support strut, via which the forces, which act on the shaft bracket, are transferred to the hull.

The at least two devices for reducing the drive power requirement of the multi screw vessels each comprise at least one hydrofoil, preferably a plurality of hydrofoils. On principle, the at least one hydrofoil can be formed by every object or every device which has a hydrofoil profile. The at least one hydrofoil of the devices is provided for influencing the propeller inflow, so that a higher energy efficiency can be reached. Preferably, the at least one hydrofoil is a stator with a hydrofoil profile, that is, a stationary element with a hydrofoil profile. In the present context the embodiment with a hydrofoil profile refers to a cross sectional view of the at least one hydrofoil. Preferably, the at least one hydrofoil has a hydrofoil profile throughout, that is, in particular across its entire longitudinal extension. It is also possible, however, for the at least one hydrofoil, viewed in the longitudinal direction thereof, to have a hydrofoil profile only in parts or in sections. Advantageously, the at least one hydrofoil is formed so as to be elongate, that is, with a significantly greater length than width. The at least one hydrofoil is to be formed or arranged in such a manner that a most advantageous propeller inflow is reached, which leads to an improved energy efficiency or to a reduced drive power requirement, respectively. In particular, this can be attained in that the at least one hydrofoil generates a pre-twist in the propeller inflow (at a suitable location).

The devices assigned to a shaft bracket each are conveniently arranged in the region of or on the shaft bracket, and/or are formed so as to be integrated with the shaft bracket or parts of the shaft bracket and/or so as to interact with the shaft bracket or parts of the shaft bracket. Viewed in the travel direction of the vessel, the devices assigned to the respective shaft bracket are in particular arranged at the height of the shaft bracket. Viewed in the longitudinal direction of the vessel, the device is in particular arranged so as not to protrude beyond the shaft bracket, in particular so as not to protrude in the direction of the vessel's propeller.

In a first embodiment alternative of the arrangement according to the invention, at least one of the shaft bracket arms of each shaft bracket is formed as a hydrofoil and forms the at least one hydrofoil of the device. Preferably, a plurality of the, in particular at least two, shaft bracket arms, more preferably all of the shaft bracket arms of each shaft bracket are formed as hydrofoils. This means that the at least one shaft bracket arm has a hydrofoil profile, at least in sections. In addition to the shaft bracket arms formed as hydrofoils it is furthermore provided for the device not to have any further hydrofoils, which are not shaft bracket arms. In this case it is advantageous that the already present shaft bracket arms only have to be redesigned as hydrofoils and that no additional hydrofoils need to be provided. Accordingly, the shaft bracket arms fulfill their normal support function with reference to the shaft bracket and, additionally, a guide function as a result of their hydrofoil profile. One end of the shaft bracket arms is connected to the shaft bracket and the other end is connected, in particular fixedly, to the vessel's hull. If the at least one shaft bracket arm is formed as a hydrofoil only in sections, it is advantageous, if at least the region of the shaft bracket arm facing the shaft bracket is formed as a hydrofoil. In the case of this alternative, the devices can consist exclusively of the at least one shaft bracket arm, which is formed as a hydrofoil, or can furthermore also comprise further components.

In a second alternative of the arrangement, each of the at least two devices comprises a fore-nozzle. The fore-nozzle is arranged upstream of the respective propeller in travel direction of the multi screw vessel. The term "in travel direction" is to be understood here as the forwards travel direction of a multi screw vessel. In contrast to Kort nozzles or rudder propellers, e.g., no propeller is arranged inside the fore-nozzle. The fore-nozzle is furthermore arranged so as to be spaced apart from the propeller. Advantageously, the fore-nozzle is formed in such a manner that the water flow flowing through said fore-nozzle is at least partially, preferably completely, guided to the propeller, which is arranged downstream. Usually the fore-nozzle will have a tubular shape. On principle, however, any other cross sectional shape, for example an angular cross sectional shape, is also possible. The fore-nozzle can be formed in one piece or integrally, respectively, or can be pieced together from a plurality of individual parts to form a fore-nozzle, wherein the individual parts are preferably connected, in particular welded, to one another or to other components of the device and/or of the arrangement. Preferably, at least a partial region of the fore-nozzle is arranged above the propeller shaft and/or below the propeller shaft of the vessel's propeller.

On principle, it is possible for the fore-nozzle to comprise only a partial section of a nozzle or of a nozzle ring (e.g. a ¼ nozzle ring, a ⅓ nozzle ring, a ½ nozzle ring, a ⅔ nozzle ring, a ¾ nozzle ring, etc.). In the case of such an embodiment, the fore-nozzle is formed so as to be open, viewed across the circumference. Preferably, however, the fore-nozzle is formed so as to be closed, viewed in circumferential direction. For this purpose, the nozzle can be formed so as to be continuous by 360° in circumferential direction. In the case of a fore-nozzle, which is formed in several parts, in particular also in the case of a closed nozzle circumference, the individual parts of the fore-nozzle can furthermore be connected to parts of the arrangement and/or of the device, so that these connection parts then form a part of the nozzle circumference. In the case of a fore-nozzle, which is open viewed across the circumference, the fore-nozzle can be formed so that at least ¾ of the total circumference is closed, so that at least ⅔ of the total circumference is closed, so that at least ½ of the total circumference is closed, so that at least ⅓ of the total circumference is closed or so that at least ¼ of the total circumference is closed.

The wall of the fore-nozzle forms an inner region, which is enclosed by the nozzle jacket or the nozzle wall at a fore-nozzle each, which is theoretically closed on the water inlet and water outlet opening. A fore-nozzle, which is closed across the circumference, as well as a fore-nozzle, which is partially open, viewed across the circumference, hereby form an inner region. In the case of the nozzle, which is partially open viewed across the circumference, the end region is enclosed in circumferential direction by the jacket of the fore-nozzle as well as by a theoretical plane between the two end points of the nozzle jacket in circumferential direction.

The at least one fin, which is formed as a hydrofoil, is arranged in the interior of the fore-nozzle, that is, in the inner region of the fore-nozzle, and/or on the outside of the fore-nozzle. Preferably, the at least one fin is fixedly connected to the fore-nozzle. It is also possible for at least one fin to be arranged on the inside and for at least one fin to simultaneously be arranged on the outside of the fore-nozzle. Two fins can also be arranged in such a manner that one fin is arranged inside the fore-nozzle and the other fin is arranged outside of the fore-nozzle, wherein, each viewed in their longitudinal direction, they are arranged downstream from one another and both are fastened to the nozzle jacket, so that a single total fin results as a whole. The at least one fin can also be arranged on the inside as well as on the outside, for example, when the fin passes through the fore-nozzle jacket. If the at least one fin is arranged on the outside of the fore-nozzle, it is advantageously fastened to the fore-nozzle, in particular with one of its ends, and is formed as a free end on its other end. If the at least one fin is arranged in the inner region of the fore-nozzle, said fin is advantageously fastened to the nozzle jacket with one end. Advantageously, the other end is fastened to the shaft bracket. On principle, however, this end could also be formed as a free end. On principle, a reverse embodiment would also be possible, in the case of which one end of the at least one fin is arranged on the shaft bracket and the other end is arranged in the interior of the fore-nozzle and is formed as a free end. The at least one fin has a hydrofoil profile and is preferably formed in the manner of a guide fin, that is, it preferably has an expansion, which is in particular significantly longer in the direction of its longitudinal axis than in the direction of its transverse axis.

In the case of the second embodiment alternative of the arrangement according to the invention, one or a plurality of the shaft bracket arms can also have a hydrofoil profile, in addition to the hydrofoil, which is formed as at least one fin. In particular, all shaft bracket arms can have a hydrofoil profile.

In the case of the first embodiment alternative of the arrangement according to the invention, in the case of which no further hydrofoils except for the shaft bracket arms are provided, a fore-nozzle or also a partial section of a fore-nozzle can be provided, as well. The fore-nozzle is then advantageously fastened to one or a plurality of the shaft bracket arms.

In the case of the two embodiment alternatives according to the invention, the at least one hydrofoil can be arranged in the interior of the fore-nozzle or on the outside of the fore-nozzle or both. It is also possible for hydrofoils to be arranged only in the interior of the fore-nozzle or only on the outside of the fore-nozzle. The at least one hydrofoil can have a hydrofoil profile throughout, that is, across its entire length. It is furthermore possible for the hydrofoil profile to only be partially present with regard to the longitudinal direction. If the at least one hydrofoil is formed as a shaft bracket arm, for example, the shaft bracket arm can have a hydrofoil profile in a partial section, whereas a further section can be formed without a hydrofoil profile, for example as a normal support with a round, rectangular or other (cross sectional) profile.

The fore-nozzle can be formed concentrically or coaxially with the propeller shaft. That is, the axis of rotation of the fore-nozzle can be located on the axis of the propeller shaft. On principle, however, the axis of rotation of the fore-nozzle can also be displaced as compared to the propeller axis, in particular to the top, to the right, to the left, to the bottom or a combination of two of these displacement directions. The axis of rotation of the fore-nozzle can also be oriented so as to be tilted as compared to the axis of the propeller shaft.

The fore-nozzle profile, that is, the profile of the nozzle jacket, preferably has a maximum thickness in the range of between 2% and 20%, preferably of between 5% and 15%, particularly preferably of between 9% and 12% of the maximum length of the fore-nozzle profile. Preferably, the fore-nozzle profile furthermore has a maximum length of between 5% and 60%, preferably of between 20% and 40%, more preferably of between 25% and 30% of the fore-nozzle diameter. The fore-nozzle can furthermore be formed so as to be rotationally symmetrical or also rotationally asymmetrical. In the case of rotationally asymmetric fore-nozzles, the maximum distance between two points on the trailing edge of the fore-nozzle, which are located farthest away from one another, is to be used instead of the diameter for determining the above-mentioned ranges. In particular, the outer diameter of the fore-nozzle is to be used for the consideration at hand.

The devices are each preferably arranged at a slight distance to the propeller. In particular, the maximum distance between the device and the respective assigned propeller is preferably maximally 50%, more preferably maximally 30%, most preferably maximally 20% of the propeller diameter.

If every device has at least two shaft bracket arms, these two shaft bracket arms are preferably arranged relative to one another at an angular distance of between 30° and 120°, preferably of between 50° and 100°, more preferably of between 60° and 80°, viewed in circumferential direction about the propeller shaft. If provision is made for three shaft bracket arms, the distance between the further shaft bracket arm and the closest one of the at least two shaft bracket arms is preferably between 30° and 90°, more preferably between 50° and 70°.

The fore-nozzle, the shaft bracket arms, the shaft brackets and/or the fins can preferably be made completely or partially of metal, in particular of steel. In the alternative or in addition, the use of other materials, for example ceramics or, in particular high-strength and/or fiber-reinforced plastics, is possible.

The at least two devices can be formed identically or also differently, the latter in particular in the case of an asymmetric hull of the multi screw vessel.

The drive power requirement of multi screw vessels is reduced in an advantageous manner by means of the arrangement according to the invention. By assigning the devices for reducing the drive power requirement of the multi screw vessels to one shaft bracket each, it is ensured that they can be sufficiently fastened and are simultaneously arranged in such a manner that the propeller inflow is optimized fluidically in such a manner that a higher drive energy yield is reached and that a smaller drive power requirement is thus at hand. The embodiment of the shaft bracket arms as hydrofoils is advantageous insofar as the shaft bracket arms must be provided in any event for supporting or fastening the shaft bracket and can thus fulfill two functions, namely the support function on the one hand and the hydrofoil function on the other hand, which is to create a pre-twist in the propeller inflow. As a result of providing a fore-nozzle, it is attained that the propeller inflow is accelerated and/or homogenized at least area by area, whereby the drive power requirement is also reduced. The fore-nozzle furthermore supports the hydrofoils, which are fastened thereto and which are formed as fins.

In the case of a preferred embodiment, the at least one shaft bracket arm, preferably the at least two shaft bracket arms, of a shaft bracket are each arranged so as to be integrated in one of the at least two devices, which are assigned to the respective shaft bracket. In the context at hand, "integrated" means that the at least one shaft bracket arm or the at least two shaft bracket arms, respectively, are each part of a device for reducing the drive power requirement. In one embodiment, the device can consist exclusively of the shaft bracket arms, namely when the latter are formed as a hydrofoil profile and if no further hydrofoils are provided. In other embodiments, the shaft bracket arms can be one of a plurality of parts of the device, wherein the shaft bracket arms are then preferably formed integrative with the other parts of the device, that is, they are in particular fixedly connected thereto and form a unit. In a preferred embodiment, provision can be made for exactly two, exactly three or exactly four shaft bracket arms for each shaft bracket. Accordingly, provision can preferably be made for two to four shaft bracket arms for each shaft bracket or preferably for two to three shaft bracket arms for each shaft bracket. Advantageously, each of the at least two shaft brackets has the same number of shaft bracket arms. More preferably, the shaft bracket arms of the at least two shaft brackets are formed identically with regard to their position and/or design and/or dimensioning, in particular length, thickness, diameter, etc. In the alternative, a different embodiment of the shaft bracket arms of the at least two shaft brackets is also preferred with regard to their position and/or design and/or dimensioning, in particular length, thickness, diameter, etc., in particular in the case of multi screw vessels with an asymmetric hull. Advantageously, the shaft bracket arms are formed in the manner of elongate support struts, which run essentially in a straight line.

Advantageously, the at least two devices are each fastened to a shaft bracket. If the device comprises a shaft bracket arm, said device can be fastened to the shaft bracket, for example via the shaft bracket arm. In the alternative or in addition, the device can be fastened to the shaft bracket by at least one fin, which belongs to it. If the device further comprises a fore-nozzle, the latter can be fastened to the shaft bracket via a shaft bracket arm and/or a fin. On principle, the fore-nozzle could also be fastened directly to the shaft bracket. This ensures that the forces acting on the device can be transferred to the vessel's hull via the shaft bracket.

It is further preferred for the at least two devices to each be fastened to the half of a respective shaft bracket facing the propeller, in particular to the end region thereof facing the propeller. The shaft bracket is often formed in the manner of an elongate sleeve, in which the propeller shaft is mounted. By arranging the device in the half of the shaft bracket facing the propeller, a distance between device and propeller, which is as small as possible, is reached. In the context at hand, the term "shaft bracket half" is to be understood such that the halves are formed by a line or plane which theoretically runs at right angles to the propeller shaft axis.

It is further preferred for the fore-nozzle to be fastened to at least one shaft bracket arm, preferably to a plurality of shaft bracket arms. Particularly preferably, the fore-nozzle is fastened to all shaft bracket arms. In particular, the fore-nozzle can be fastened to exactly two shaft bracket arms or to exactly three shaft bracket arms or also to exactly four shaft bracket arms for each device. A stable arrangement of the fore-nozzle is reached through this. Provision can in particular be made for the fore-nozzle to be formed in a plurality of parts, wherein, for example, one part of the fore-nozzle is fastened between two shaft bracket arms, and further parts of the fore-nozzle are fastened to the respective other sides of the shaft bracket arms. Viewed in travel direction of the vessel, the shaft bracket arms can be formed so as to be integrated completely in the nozzle jacket, so that they are enclosed completely by the nozzle jacket in the contact point or in the fastening region, respectively. On principle, it would also be possible for the shaft bracket arms, viewed in travel direction of the vessel, to protrude only partially into the nozzle jacket.

In one embodiment, it is preferred for each device to comprise exactly three shaft bracket arms. In particular, this is preferred in the case of the first alternative embodiment of the arrangement, in the case of which a shaft bracket arm is formed as at least one hydrofoil and in addition to the shaft bracket arms no further hydrofoils are provided. Here it is further preferred for the angular distance between the first, in particular the lowermost shaft bracket arm, and the second, in particular central shaft bracket arm, to be in the range of between 30° and 90°, more preferably of between 50° and 70°, and for the angular distance between the second, in particular central, and the third, in particular upper shaft bracket arm, to be in the range of between 30° and 90°, more preferably of between 50° and 70°.

In a further preferred embodiment according to the second embodiment alternative of the arrangement according to the invention, in the case of which provision is made for at least one fin, which is formed as a hydrofoil, and for a fore-nozzle, provision is made for between two and ten fins, more preferably for between three and seven fins, most preferably for between three or four fins. In this case, the fins can be fastened only on the inside of the fore-nozzle or only on the outside of the fore-nozzle or both on the inside as well as on the outside. The internal fins are preferably fastened to the shaft bracket and to the inside of the fore-nozzle. More preferably, in this embodiment a total of three or four fins and two shaft bracket arms are provided, wherein in the case of this consideration, a fin, which probably has a part located inside the fore-nozzle as well as a part located outside the fore-nozzle, but which is located in a line and is thus a total fin and which is formed as a guide fin acting as a unit, is each considered to be a fin. Particularly preferred is an embodiment, in which two fins have parts located on the inside as well as on the outside, two shaft bracket arms are provided and additionally one or two further fins located only inside the fore-nozzle are provided.

It is furthermore preferred for the at least one hydrofoil of the arrangement to have an angle of attack and/or for the at least one hydrofoil to be formed to be twisted and thus has an angle of twist. The angle of twist can be constant or also varying. Depending on the attack direction, the angle of attack can be positive or negative. The angle of attack range details specified below are thus to be understood as value, that is, they can be positive or negative, depending on the direction of the attack. More preferably, the angle of attack is formed in the range of between >0° and 40°, preferably of between >0° and 25°, more preferably of between 3° and 20° Viewed across the length of the at least one hydrofoil, the angle of attack can be formed so as to vary or so as to be constant, wherein, in the first alternative, at least the angle of attack is then preferably within one of the above-mentioned ranges at one point of the hydrofoil. If a plurality of hydrofoils is provided, the angles of attack of all of the hydrofoils can be identical or can also differ from one another. Compared to one another, the degree of twist of the hydrofoils can also be identical or different. The hydrofoil, which has at least one angle of attack and/or which is twisted, can in particular be a fin and/or a shaft bracket arm. In the case at hand, the angle of attack, often also referred to as angle of inflow, is to be understood to be the angle between the direction of the inflowing fluid (here in particular water) and the axis of the profile of the hydrofoil in the respective hydrofoil cross section. Accordingly, said angle of attack specifies a measure for the size of the attack of the hydrofoil profile for the inflow. If the at least one hydrofoil is formed so as to be twisted or wound, this angle of attack will vary inevitably, viewed across the length of the hydrofoil. Viewed across the length of the at least one hydrofoil, it is in particular also possible for only a partial region to have an angle of attack and for a different region to be formed without an angle of attack or with an angle of attack of 0°, respectively. In the case of a device, one or a plurality of hydrofoils can also have an angle of attack and one or a plurality of hydrofoils can simultaneously not have an angle of attack (that is, an angle of attack of 0°).

If the at least one hydrofoil has an angle of attack and/or if it is formed so as to be twisted, it is further preferred for the angle of attack and/or the degree of twist of the at least one hydrofoil in the region of the at least one hydrofoil which faces the shaft bracket to be larger or smaller than in the remainder of the at least one hydrofoil. Advantageously, a larger or also a smaller pre-twist is created through this, in particular in the region of the propeller inflow, in which it is particularly advantageous with regard to the drive efficiency. The region of the at least one hydrofoil facing the shaft bracket can in particular be the region with which the at least one hydrofoil adjoins the shaft bracket. For example, this can also be a region which extends across maximally 40% of the total length of the hydrofoil, in particular maximally across 20%, more preferably across maximally 10%, most preferably across maximally 5% from the end of the hydrofoil facing the shaft bracket. In the alternative, the region of the at least one hydrofoil facing the shaft bracket can have a length which corresponds to a length of up to 50%, preferably of up to 20%, more preferably of up to 10%, most preferably of up to 5%, of the propeller diameter. If the angle of attack varies within the region facing the shaft bracket, that is, if it is not constant, the maximum value is to be used for the purposes at hand. In the present case, the term "degree of twist" is to be understood as the size of the difference between the largest and the smallest angle of twist within a certain region of the at least one hydrofoil, viewed in longitudinal direction. For example, the region used for this purpose can have a predetermined length, in particular a length of between 1% and 20%, preferably of between 5% and 10%, of the total length of the at least one hydrofoil.

In a further preferred embodiment, provision is made for the at least one hydrofoil, which can in particular be formed as a shaft bracket arm or as a fin, to be capable of having different profile thicknesses and/or profile lengths, viewed in the longitudinal direction thereof. It is preferred here, in particular, for the region of the at least one hydrofoil facing the shaft bracket, to have a larger profile thickness than the remainder of the at least one hydrofoil. In the alternative or in addition, it is preferred for the profile of the at least one hydrofoil to taper from its end facing the shaft bracket to its end facing away from the shaft bracket with reference to its profile thickness and/or with reference to its profile length. For the present embodiment, the region of the at least one hydrofoil facing the shaft bracket thereby is to be defined in the same manner as for the preceding embodiment, so that the definition can be applied analogously here. The profile length corresponds to the distance between the front nose region of the profile and the trailing edge of the profile in cross sectional view and thus runs along the chord. The profile thickness refers to the maximum thickness of the profile. This embodiment is also advantageous insofar as the pre-twist, which is induced by means of the at least one hydrofoil, makes the propeller inflow to be even more drive-efficient.

Viewed in travel direction of the vessel, the shaft bracket arms can have a larger expansion or width than the fore-nozzle and/or the fins. Viewed in travel direction of the vessel, the shaft bracket arm can in particular have a larger length than the fore-nozzle in the region, in which the fore-nozzle is connected to said shaft bracket arm. In such a case, the shaft bracket arm protrudes beyond the fore-nozzle on both sides, viewed in travel direction of the vessel. Preferably viewed in travel direction of the vessel, the at least one fin has a smaller or maximally an identical expansion as compared to the fore-nozzle, in particular in the region in which the fin is fastened to the fore-nozzle.

It is further preferred for the arrangement to comprise at least two propellers, which are operatively connected to the propeller shafts, as well as at least two rudders, wherein each of the at least two rudders is assigned to one of the at least two propellers. Preferably, the at least two rudders further have a propulsion bulb each, which is arranged at a slight distance downstream from the hub of the respective propeller. In the present context, "operatively connected" means that the respective propeller shaft drives the operatively connected propeller. On principle, propulsion bulbs are known from the prior art and are often formed in such a manner that they interact with the propeller hub such that the hub vortex inducted by the propeller hub is reduced. On the part of applicant, it was determined that the arrangement according to the invention operates in a particularly drive-efficient manner, if rudders with propulsion bulbs are each arranged downstream from the propellers. The efficiency of the drive power requirement can be improved further, if so-called twisted rudders are provided, in the case of which partial regions of the rudder blade are offset against one another. Propulsion bulbs are often also called "bulbs".

The object on which the invention is based is also solved by means of a multi screw vessel, in particular a twin screw vessel, with external propeller shafts, which comprises an arrangement as described above in any of the embodiment alternatives or preferred embodiments, respectively, as described above.

The invention furthermore relates to a method for producing an arrangement for multi screw vessels, in particular twin screw vessels, with external propeller shafts. In the case of the above-mentioned method, the object on which the invention is based is solved in that provision is made for at least two devices for reducing the drive power requirement of the vessels, wherein each device comprises a fore-nozzle and at least one hydrofoil, wherein the at least one hydrofoil is arranged in the interior of the fore-nozzle and/or on the outside of the fore-nozzle, wherein the at least two devices are each arranged on and fastened to a shaft bracket of a propeller shaft of the multi screw vessel in such a manner that at least one shaft bracket arm, preferably at least two shaft bracket arms, of a shaft bracket are arranged so as to be integrated in one of the at least two devices. The arrangement is preferably formed in one of the embodiment alternatives or preferred embodiments, respectively, as described above. The components used in the method, in particular the devices, the at least one hydrofoil, the fore-nozzle, the shaft bracket, the propeller shaft and the shaft bracket arms can preferably be formed in one of the embodiments as described above.

The following steps are carried out in a further development of the method:

a) providing at least two shaft bracket arms, which are each formed as a hydrofoil, and fastening the at least two shaft bracket arms with one shaft bracket arm end region to a shaft bracket, and with the other shaft bracket arm end region to the vessel's hull, b) providing a fore-nozzle, which is open or closed across the circumference, wherein the fore-nozzle comprises at least two nozzle segments, c) arranging a first nozzle segment between the at least two shaft bracket arms, d) fastening each of the two end regions of the first nozzle segment to a first side of adjacent shaft bracket arms of the at least two shaft bracket arms, and e) fastening at least one end region of a second nozzle segment to a second side of one of the at least two shaft bracket arms.

As a result of this production method, the device and in particular the fore-nozzle of the device is connected to the shaft bracket arms in an integrative manner. This is attained in particular by providing at least two nozzle segments, wherein the first nozzle segment is fastened between two shaft bracket arms, and the other nozzle segment is fastened to a different, second side, of one of the at least two shaft bracket arms. With both end regions, the second nozzle segment can preferably each be fastened to a second side of the at least two shaft bracket arms, thus resulting in a closed nozzle arrangement as a whole. The nozzle segments are thereby preferably formed in the manner of annular segments, which together form a closed or partially closed fore-nozzle. The at least two nozzle segments are provided separately from one another and are each separately fastened to the shaft bracket arms. The above-mentioned steps a) to e) can also take place in a different time sequence. Preferably, they take place in the time sequence as specified by the numbering. Advantageously, the at least two shaft bracket arms are fastened to the same shaft bracket or support the same shaft bracket, respectively. The end regions of a respective shaft bracket arm are arranged diametrically to one another, that is, on opposite sides of the shaft bracket arm. The terms "first side" and "second side" of the adjacent shaft bracket arms in particular refer to the side surfaces of the shaft bracket arms. In particular, they can be arranged opposite one another. The fastening can preferably be established by means of welding.

It is furthermore preferred for the following steps to be provided additionally:

a1) providing fins which are formed as hydrofoils and fastening the fins to the shaft bracket with one end region, b1) if applicable, providing through holes in one or a plurality of the nozzle segments, leading the fins through the through holes, and fastening the fins to the respective nozzle segment, and b2) if applicable, fastening one or a plurality of fins to the exterior of one or a plurality of nozzle segments.

The above-mentioned steps a1), b1) and b2) can each be carried out in a different, in a suitable time sequence. With reference to step b1), some or also all fins can be guided through holes in the nozzle segments.

The invention furthermore relates to a further method for producing an arrangement for multi screw vessels, in particular twin screw vessels, with external propeller shafts. In the case of this method, the object on which the invention is based is solved by providing at least two devices for reducing the drive power requirement of the vessels, wherein each device comprises at least one hydrofoil, wherein the at least two devices are each arranged and fastened to a shaft bracket of a propeller shaft of the multi screw vessel, wherein at least three shaft bracket arms, preferably exactly three shaft bracket arms are provided for each shaft bracket, which are each connected to the hull of the multi screw vessel with their one end, and which are fastened to the shaft bracket with their other end, wherein the at least three shaft bracket arms are each formed as hydrofoils of the device, wherein no further hydrofoils are provided in addition to the shaft bracket arms, wherein preferably at each device a fore-nozzle is provided, which, together with the at least three shaft bracket arms, which are formed as hydrofoils, each forms a device, and wherein, according to an embodiment alternative or a preferred embodiment, respectively, the arrangement is preferably formed as described above.

BRIEF DESCRIPTION OF THE DRAWINGS

Preferred exemplary embodiments of the invention will be explained below by means of the figures. Schematically:

FIG. 8A shows a side view of a partial region of a twin screw vessel with an arrangement, a propeller and a rudder;

DETAILED DESCRIPTION OF THE PREFERRED EMBODIMENTS

Figure 1:
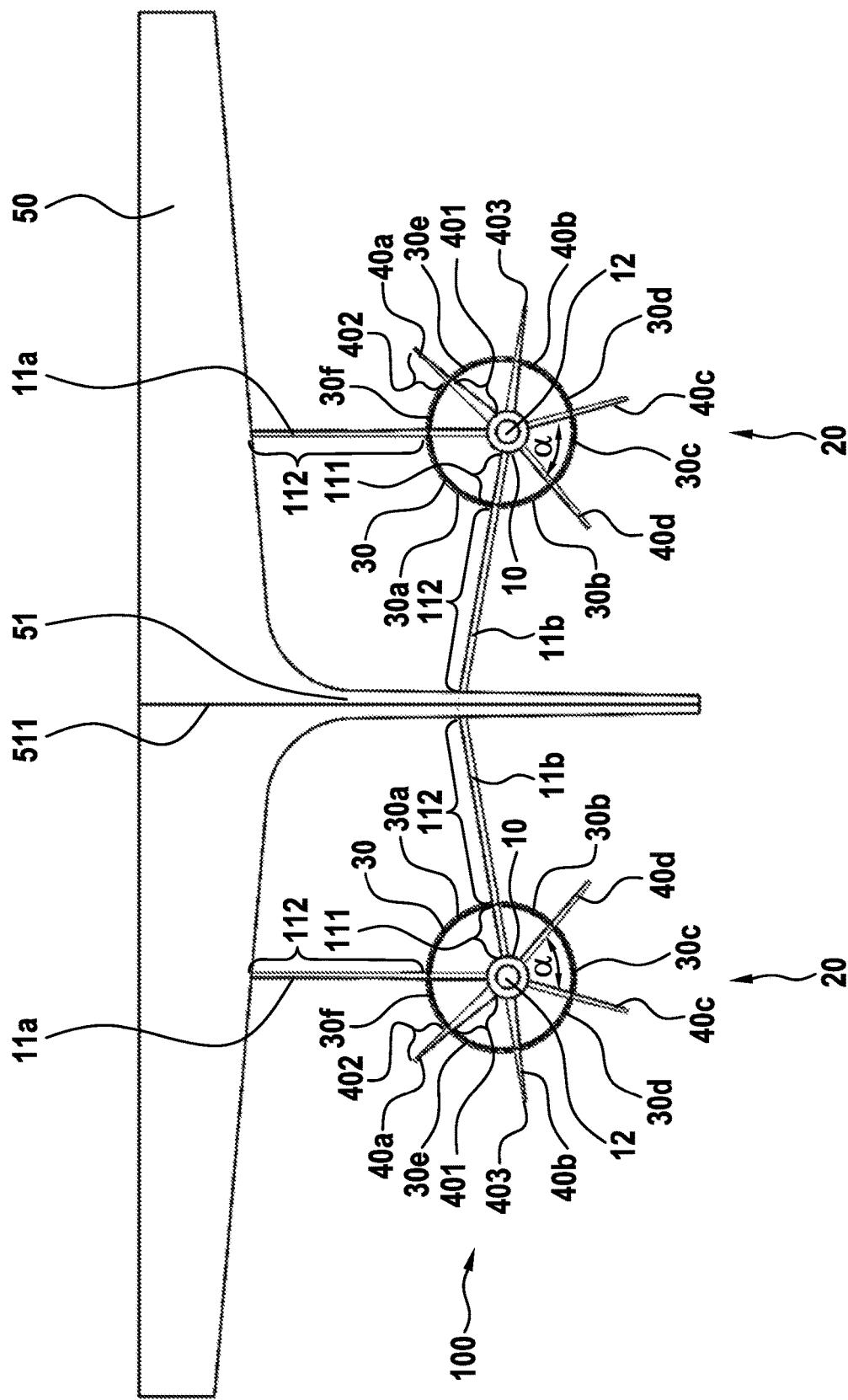
FIGS. 1 to 7 show schematic views onto a twin screw vessel from the rear, each with a different embodiment of the arrangement without illustration of the propellers and the rudders.

In the case of different embodiments, the same components will also be labeled with the same reference numerals below.

FIGS. 1 to 7 each show a view from the rear onto a twin screw vessel, wherein provision is made in each figure for a different embodiment of the arrangement according to the invention on the twin screw vessel. For the sake of clarity, the vessel's propellers as well as the rudders arranged downstream from the vessel's propellers, have been omitted in FIGS. 1 to 7.

FIG. 1 shows a twin screw vessel with a hull 50, wherein the twin screw vessel is provided with an arrangement 100 according to the invention. The arrangement 100 comprises two shaft brackets 10, in which propeller shafts 12 are mounted. The propeller shafts 12 are at least partially located outside of the hull 50. Accordingly, the shaft brackets 10 are also located outside of the hull 50. The shaft brackets 10 sheath the propeller shaft 12 and support the latter. The hull 50 has a central web 51, which protrudes downwards. Provision is made on each side of this central web 51 for a shaft bracket 10, which supports a propeller shaft 12.

Each of the two shaft brackets 10 is fixedly connected to the hull 50 via two shaft bracket arms 11a and 11b. Accordingly, the shaft bracket arms 11a and 11b are each fixedly connected to the hull 50 with one end and to the shaft bracket 10 with their other, opposite end. As a whole, FIG. 1 thus illustrates four shaft bracket arms 11a, 11b.

A device 20 for reducing the drive power requirement of the twin screw vessel is assigned to each shaft bracket 10. Each of the devices 20 thereby comprises a fore-nozzle 30 as well as four fins 40a, 40b, 40c, 40d. The fins 40a, 40b, 40c, 40d each comprise an inner part 401 as well as an outer part 402. The inner part 401 of the fins 40a, 40b, 40c, 40d thereby runs from the shaft bracket 10 to the fore-nozzle 30, and the outer part 402 of the fins 40a, 40b, 40c, 40d runs from the fore-nozzle 30 to a free end 403 of the fins 40a, 40b, 40c, 40d. The fins 40a, 40b, 40c, 40d are fixedly connected to the shaft bracket 10 with their respective inner part 401. Likewise, the fins 40a, 40b, 40c, 40d are fixedly connected to the fore-nozzle 30. The fins 40a, 40b, 40c, 40d can thereby be guided through the nozzle jacket through a recess (not illustrated here) in the fore-nozzle 30 and can be fixedly connected to the fore-nozzle 30, e.g. by means of welding, in the region of the recess. In the case of this embodiment, the fins 40a, 40b, 40c, 40d consist of a single, continuous guide fin. In an alternative embodiment, the fins 40a, 40b, 40c, 40d can be formed in two parts, wherein one part is formed as inner part 401 between the fore-nozzle 30, in particular the inside of the nozzle jacket, and the shaft bracket 10, and the other part is arranged as outer part 402 of the fins 40a, 40b, 40c, 40d on the fore-nozzle 30, in particular on the outer jacket of the fore-nozzle 30, with one end. All of the fins 40a, 40b, 40c, 40d have a hydrofoil profile. The length of the individual fins 40a, 40b, 40c, 40d can be identical to one another or different from one another. The angular distances α of the individual fins 40a, 40b, 40c, 40d can also be identical or different among one another.

The fore-nozzles 30 from the arrangement according to FIG. 1 have a circular cross section and are thus formed rotationally symmetrically. The fore-nozzle 30 has individual sections 30a, 30b, 30c, 30d, 30e, 30f, which are each arranged between two fins 40a, 40b, 40c, 40d, two shaft bracket arms 11a, 11b or one fin 40a, 40b, 40c, 40d and one shaft bracket arm 11a, 11b. The individual fore-nozzle sections 30a, 30b, 30c, 30d, 30e, 30f can be separate components or can also be formed in one piece, either partially or completely. In particular, the section 30a, which is arranged between the two shaft bracket arms 11a, 11b, can be formed as a detached, separate section, and thus as an independent nozzle segment, and the remaining fore-nozzle sections 30b to 30f can be formed as an individual, cohesive component. The section 30b is arranged between the shaft bracket arm 11b and the fin 40d, the fore-nozzle section 30c is arranged between the fin 40d and the fin 40c, the fore-nozzle section 30d is arranged between the fin 40c and the fin 40b, the fore-nozzle section 30e is arranged between the fin 40b and the fin 40a, and the fore-nozzle section 30f is arranged between the fin 40a and the shaft bracket arm 11a and is fastened to each of hem.

The shaft bracket arms 11a and 11b are also provided with a hydrofoil profile. In particular the inner part 111 of the shaft bracket arms 11a, 11b is thereby provided with a hydrofoil profile. The inner part 111 is that part of the shaft bracket arms 11a, 11b, which is arranged inside, that is, in the interior of the fore-nozzle 30. On principle, however, the outer parts 112 of the shaft bracket arms 11a, 11b, that is, the parts of the shaft bracket arms 11a, 11b, which are arranged outside of the fore-nozzle 30, can be equipped with a hydrofoil profile, at least in part, but also completely without a hydrofoil profile.

All of the shaft bracket arms 11a, 11b as well as all of the fins 40a, 40b, 40c, 40d extend radially from the shaft bracket 10 to the outside. The fore-nozzle 30 is arranged concentrically with the shaft bracket 10 or with the propeller shaft 12, that is, the axis of rotation of the fore-nozzle 30 is located on the axis of the shaft bracket 10 or on the axis of the propeller shaft 12, respectively. The two devices 20, which are each located on the starboard side and on the portside of the central web 51, are symmetrical to one another with respect to a vertical axis 511, which is preferably arranged in the center of the vessel with respect to the transverse direction of the vessel, which, in the example at hand, is formed by the central axis of the central web 51. In particular, the fins and shaft bracket arms are arranged symmetrically to one another with respect to the vertical axis 511. The device 20 is held on the hull 50 by means of the two shaft bracket arms 11a, 11b. Forces acting on the devices 20 are thus also transferred to the hull 50 via the shaft bracket arms 11a, 11b.

Figure 2:
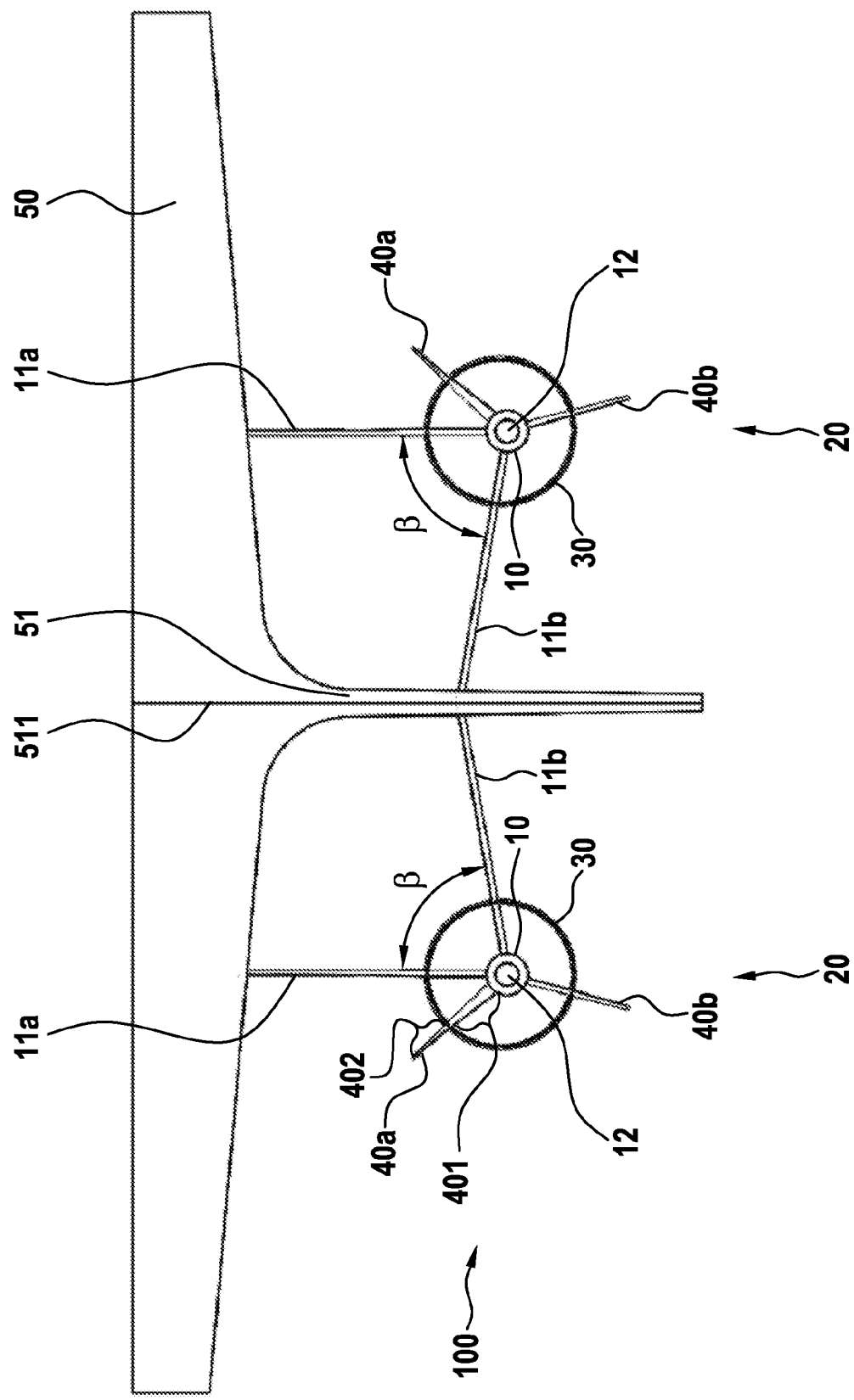

FIG. 2 shows a similar embodiment as compared to the embodiment from FIG. 1. In contrast, FIG. 2 has only two fins 40a, 40b, for each device 20, instead of four fins. Apart from that, the arrangement 100 from FIG. 2 is formed so as to be identical to the arrangement from FIG. 1. To get to the embodiment of FIG. 2, the fins 40b and 40d would need to be omitted in each device 20 in FIG. 1. Accordingly, the fins 40a and 40b of FIG. 2 are fins, which have an inner part 401 as well as an outer part 402. As compared to the embodiment from FIG. 1, the shaft bracket arms 11a, 11b are unchanged, as well. In particular, the angular distance β between the shaft bracket arms is also identical as compared to the embodiment from FIG. 1. In this embodiment, as in the embodiment from FIG. 1, all of the fins 40a, 40b each also have a hydrofoil profile across their entire length.

Figure 3:
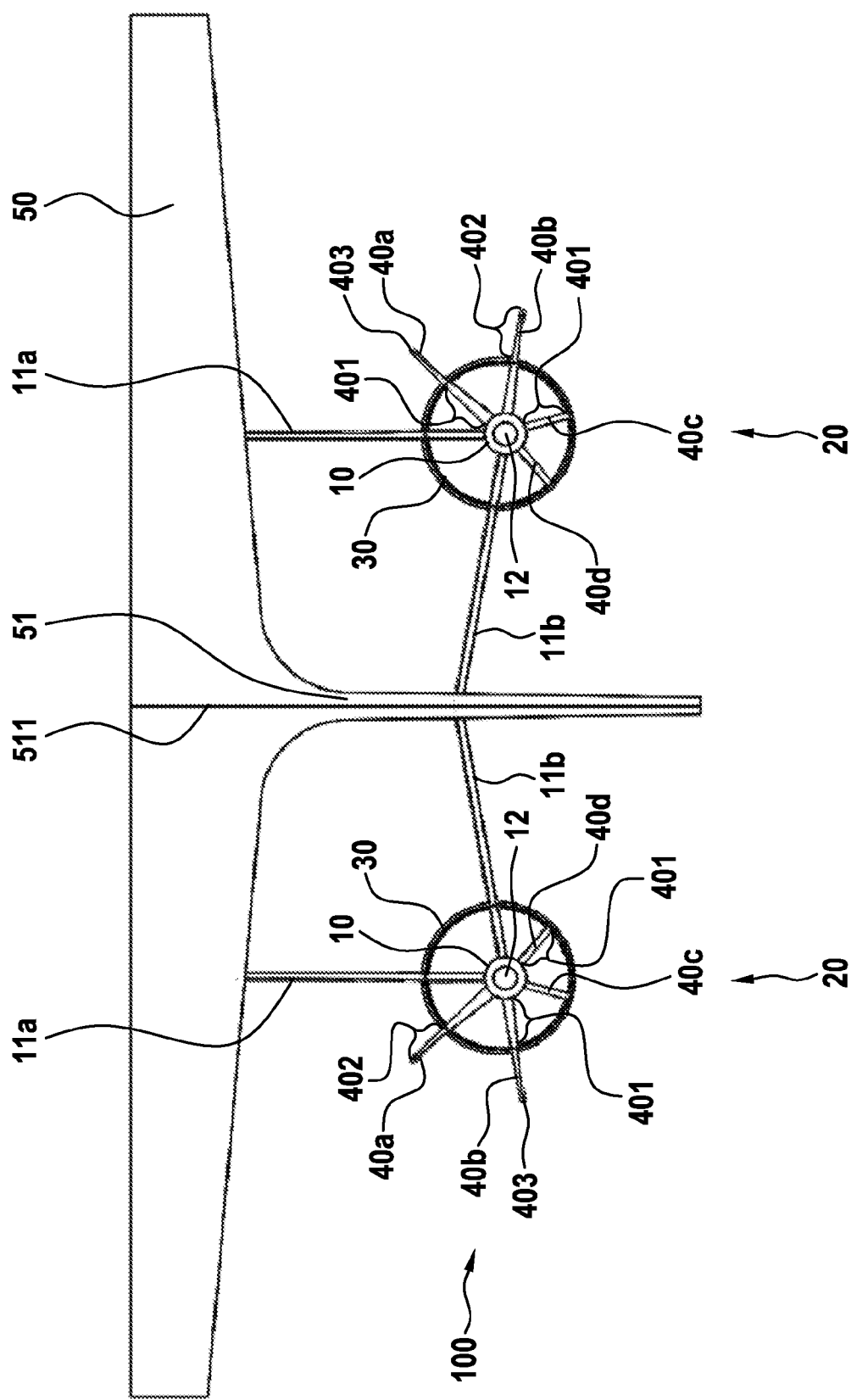

The embodiment according to FIG. 3 is similar to the embodiment according to FIG. 1, wherein, in contrast to the embodiment from FIG. 1, the fins 40c and 40d in FIG. 3 each only have an inner part 401. That is, the fins 40c, 40d run from the shaft bracket 10 to the fore-nozzle 30, whereas the fins 40a, 40b run from the shaft bracket 10 to the fore-nozzle 30 and protrude outwards beyond the latter. In particular, the fins 40a, 40b have an inner part 401 as well as an outer part 402, whereas the fins 40c and 40d only have an inner part 401. The angular distances α of the fins 40a, 40b, 40c, 40d among one another and to the shaft bracket arms 11a, 11b are identical to those from FIG. 1. Likewise, the angular distance β between the shaft bracket arms 11a, 11b is identical as compared to FIG. 1.

Figure 4:
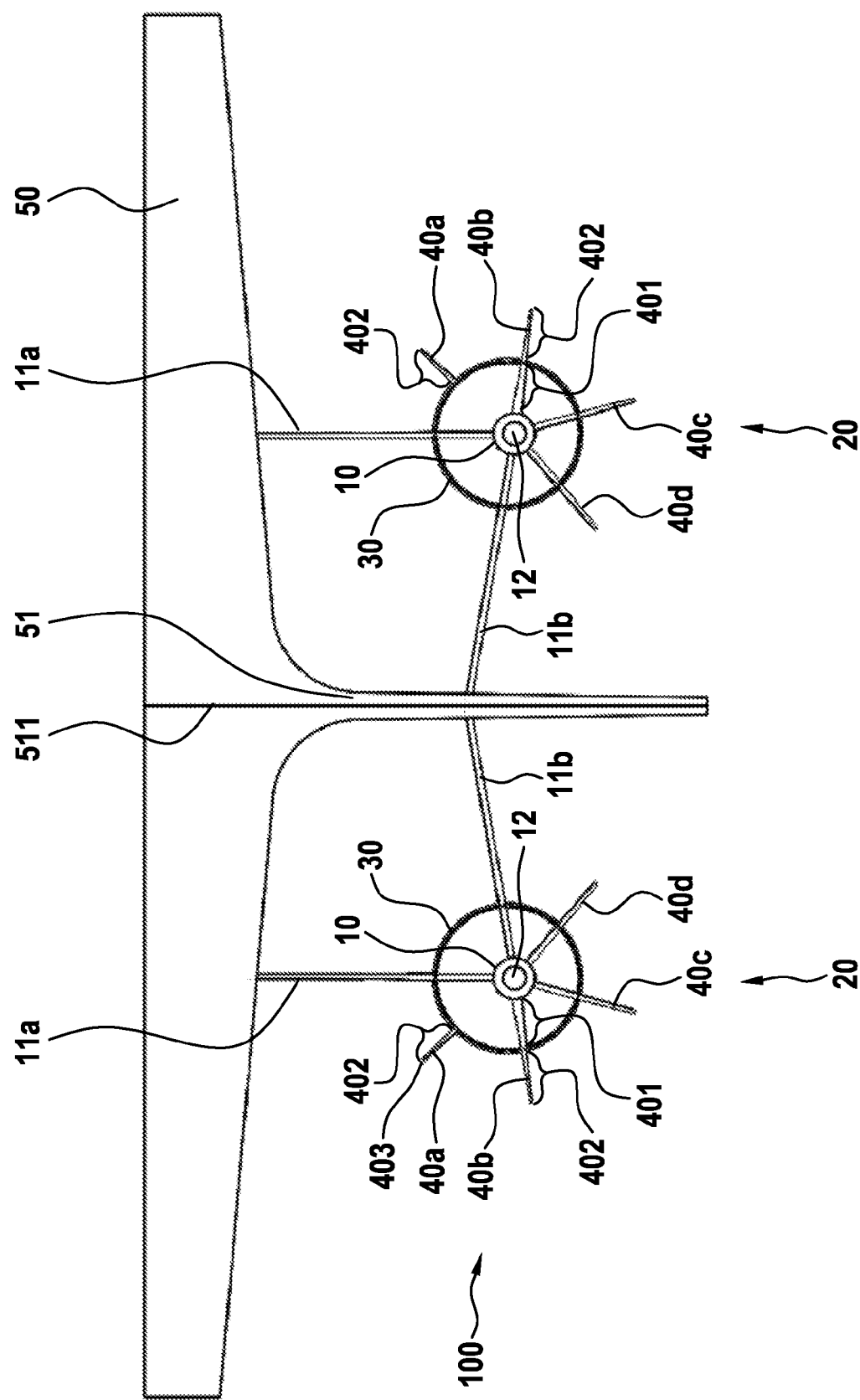

FIG. 4 shows an embodiment, which is similar to the illustration from FIG. 1. In contrast to the embodiment alternative from FIG. 1, in the embodiment alternative according to FIG. 4 only an outer part 402 is provided in the case of fin 40a. All other fins 40b, 40c, 40d have an inner part 401 as well as an outer part 402. The fin 40a thus starts at the fore-nozzle 30 and runs all the way to its free end 403. Apart from that, the positioning of the fins as well as of the shaft bracket arms 11a, 11b is identical with the embodiment from FIG. 1.

Figure 5:
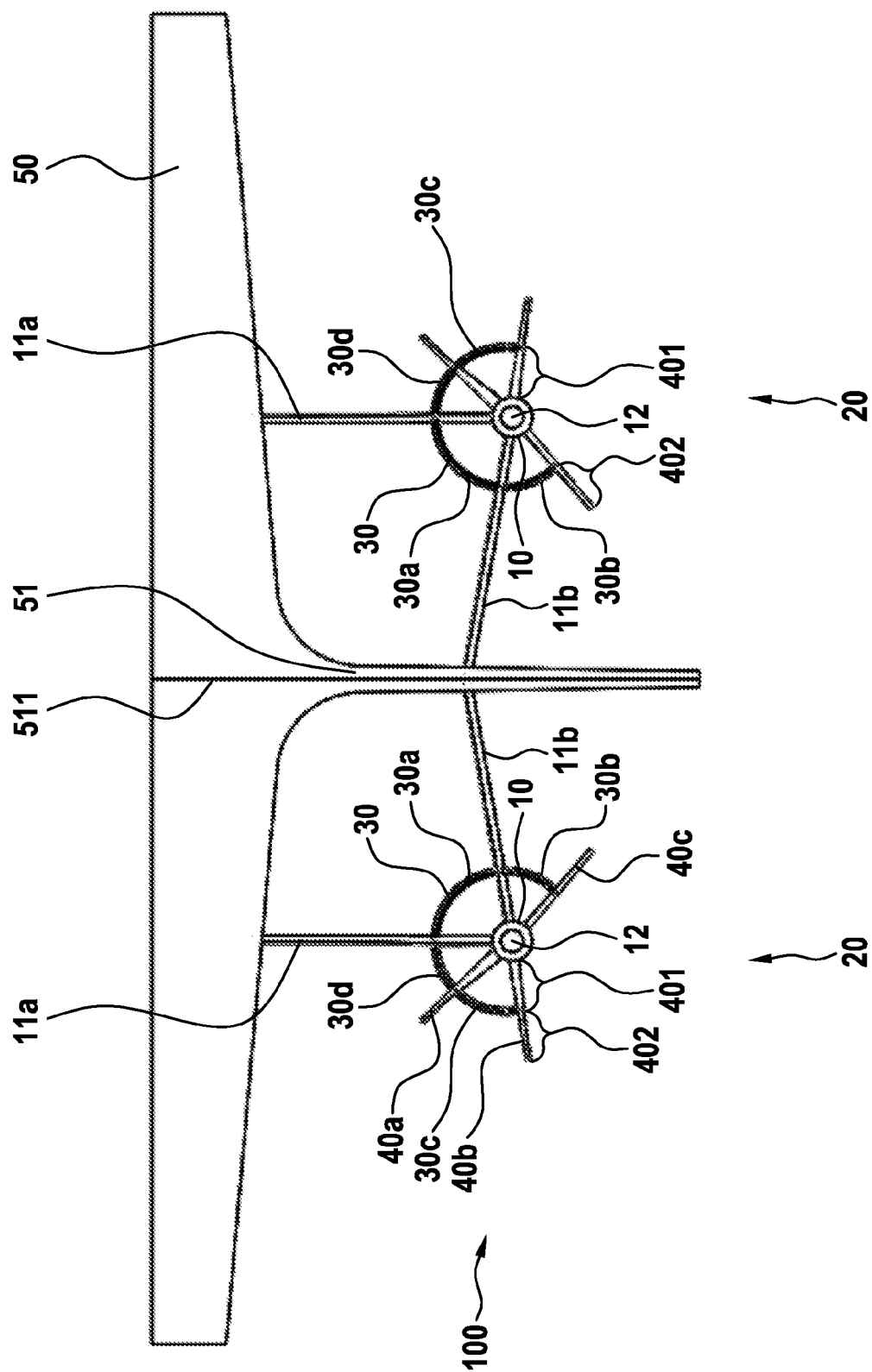

The embodiment according to FIG. 5 is also similar to that from FIG. 1. In contrast to the embodiment alternative from FIG. 1, the embodiment alternative according to FIG. 5 only has three fins, namely the fins 40a, 40b and 40c. As compared to the embodiment from FIG. 1, the fin 40c would need to be omitted in FIG. 1, so as to get to the fin arrangement from FIG. 5. Accordingly, the fins 40a, 40b and 40c from FIG. 5 each have an inner part 401 as well as an outer part 402. In the case of the embodiment alternative of FIG. 5, a further difference to the embodiment alternative of FIG. 1 is that the fore-nozzle 30 is not formed so as to be closed across its circumference. In the case of the other above-mentioned alternatives of FIG. 1 to FIG. 4, the fore-nozzle 30 is formed so as to be completely closed across the circumference. According to FIG. 5, no fore-nozzle segment or no nozzle jacket, respectively, runs between the fin 40c and the fin 40b. A lower region of the fore-nozzle 30, which is smaller than half of the (imaginary) total nozzle circumference, is thus formed so as to be open. This open embodiment of the fore-nozzle can also be combined with other embodiment alternatives of the fins and/or of the shaft bracket arms.

The fore-nozzle 30 thus consists only of the fore-nozzle sections 30a located between the shaft bracket arms 11a and 11b, the fore-nozzle section 30b located between the shaft bracket arm 11b and the fin 40c, the fore-nozzle section 30c located between the fin 40b and the fin 40a, and the fore-nozzle section 30d located between the fin 40a and the shaft bracket arm 11a. All other embodiment features, in particular the arrangement of the fins 40a, 40b, 40c provided in FIG. 5 and of the shaft bracket arms 11a, 11b, are identical as compared to the embodiment from FIG. 1.

Figure 6:
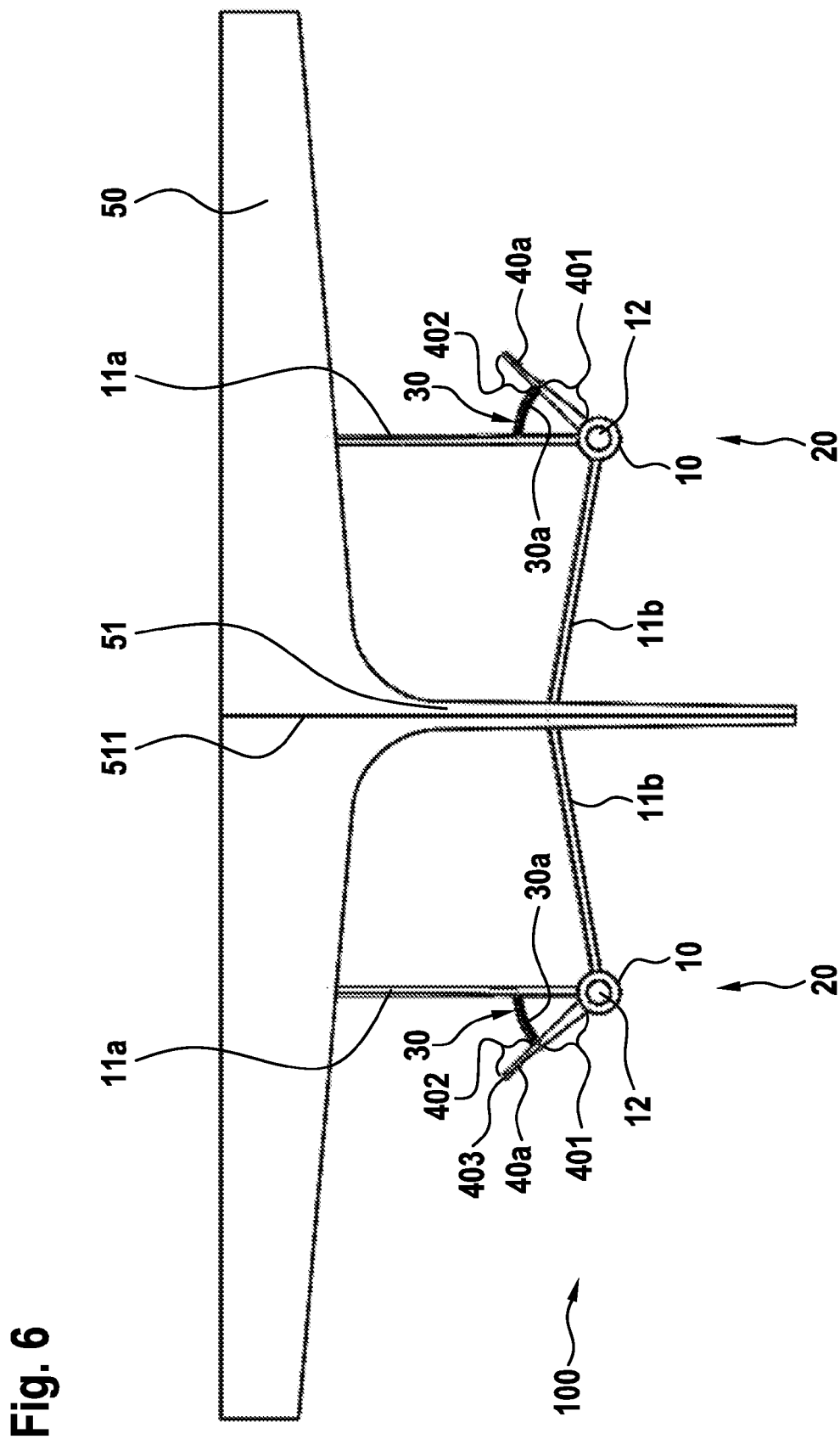

Just like in FIG. 1, the device 20 in the case of the embodiment alternative of FIG. 6 comprises two shaft bracket arms 11a, 11b. In the case of FIG. 6, the difference to the embodiment alternative of the arrangement 100 according to FIG. 1 is that only a single fin 40a is provided and that a fore-nozzle 30 in the form of the nozzle section 30a, which forms a single nozzle segment, is provided only between the fin 40a and the shaft bracket arm 11a. Apart from that, no further fore-nozzle segments or fore-nozzle sections are provided. The fin 40a has an inner part 401, which runs from the shaft bracket 10 to the fore-nozzle 30, and an outer part 402, which runs from the fore-nozzle 30 to a free end 403.

Figure 7:
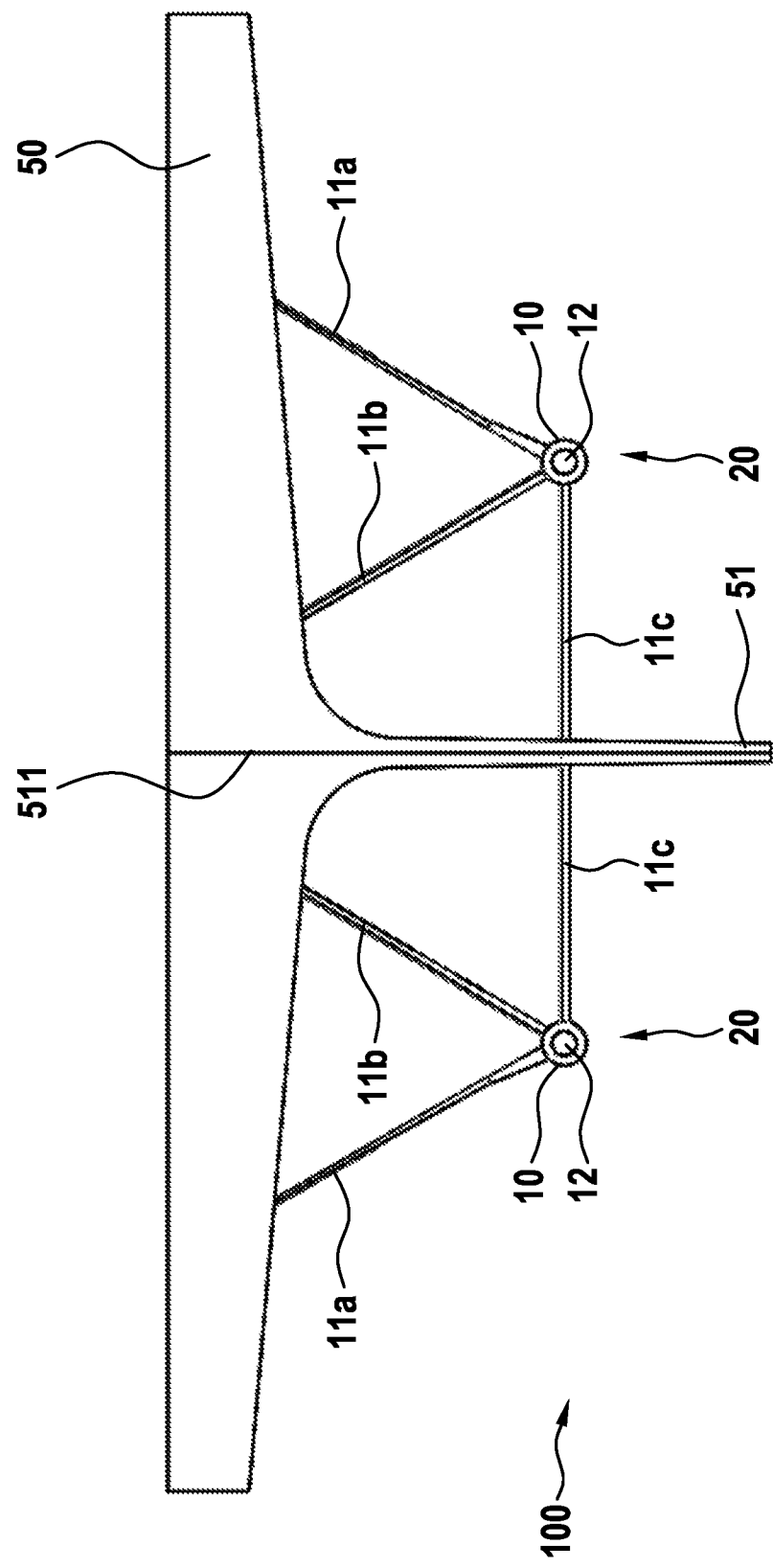

The above-mentioned exemplary embodiments fall under the second embodiment alternative of the arrangement according to the invention, which is described in the description above, in the case of which the device comprises a fore-nozzle and at least one fin each, which is formed as a hydrofoil. In contrast, the embodiment alternative described below, which is illustrated in FIG. 7, falls under the first embodiment alternative of the arrangement according to the invention, which is described in the description above, in the case of which at least one shaft bracket arm is formed as a hydrofoil of the device, and wherein no further hydrofoils are provided, in particular no further hydrofoils, which are formed as fins, in addition to the shaft bracket arm.

Just as is shown in FIGS. 1 to 6, FIG. 7 shows a rear view onto a hull 50 with a central web 51, on both sides of which a shaft bracket 10 each with a propeller shaft 12 mounted therein is provided. The shaft brackets 10 as well as three shaft bracket arms 11a, 11b, 11c each form a device 20 for reducing the drive power requirement of a twin screw vessel. The shaft brackets 10 are fixedly connected to the hull 50 via the shaft bracket arms 11a, 11b, 11c. The shaft bracket arms 11a, 11b, 11c stick out radially from the shaft bracket 10 and are fastened to the shaft bracket 10 with one end and to the hull 50 with the other end. In the embodiment at hand, all three shaft bracket arms 11a, 11b, 11c are provided with a hydrofoil profile, that is, all of them represent a hydrofoil of the device 20. Beyond that, no further hydrofoils are provided, in particular no fins. In this embodiment, no fore-nozzle is provided, either. The shaft bracket arms 11a, 11b, 11c as well as the shaft brackets 10 can be formed according to the embodiments from FIGS. 1 to 6. In the case of an embodiment according to FIG. 7, a symmetry of the two devices 20 with respect to the vertical axis 511 is at hand. Fundamentally, a symmetrical, in particular an axially symmetrical embodiment (viewed with respect to a vertical axis) of the two devices is preferred, regardless of a certain embodiment, because, viewed in longitudinal direction, the two vessel hull halves are on principle formed symmetrically in the case of most of the twin screw vessels.

Figure 8B:
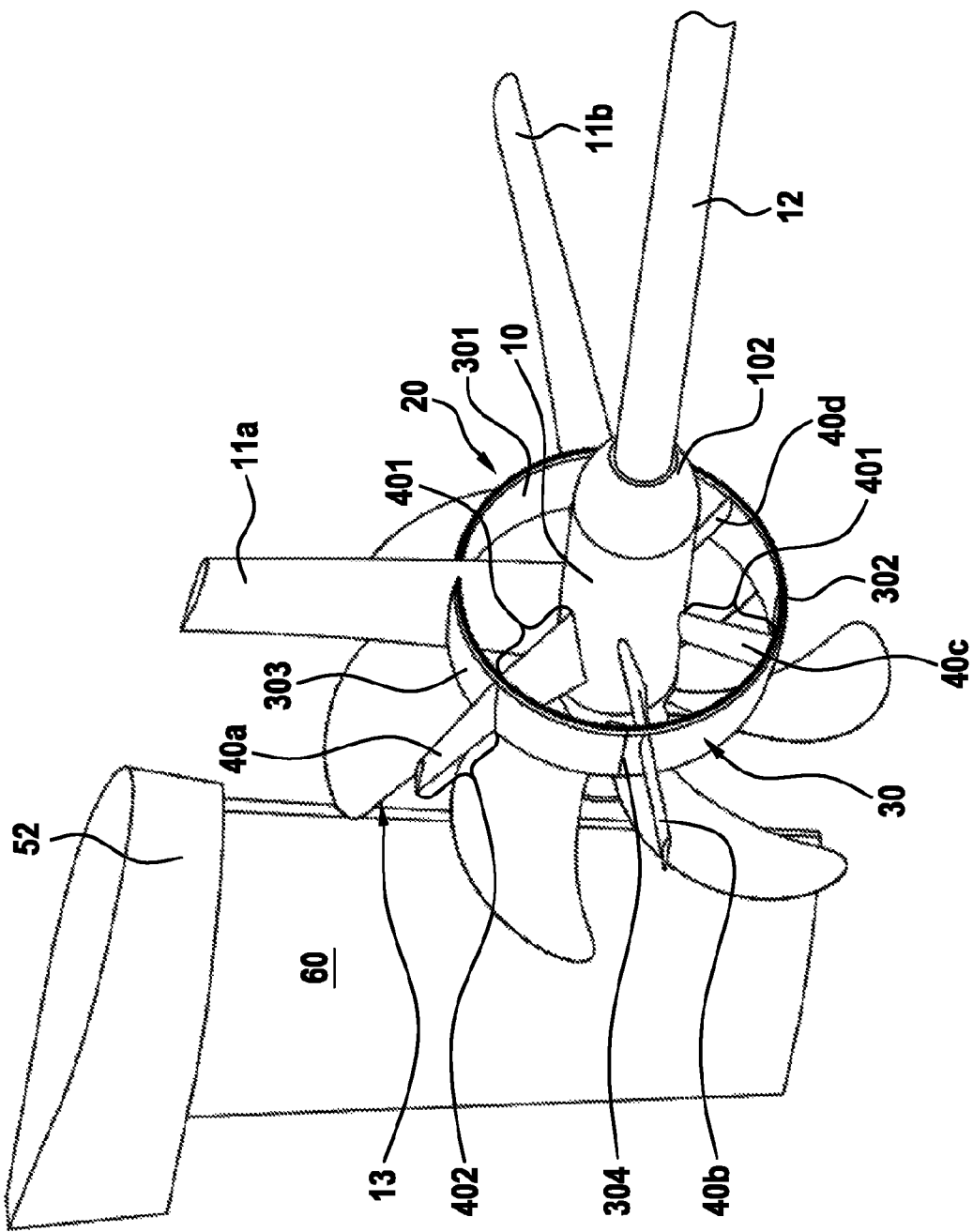
FIG. 8B shows the embodiment according to 8A from a perspective view at an incline from the front.

FIGS. 8A and 8B show a device 20 in a side view (FIG. 8A) as well as in a perspective view (FIG. 8B) at an incline from the front. The device 20 is formed similarly to the device from FIG. 3, that is, with two shaft bracket arms, a nozzle ring 30, which is closed completely across the circumference, two fins 40a, 40b, which have an inner part 401 as well as an outer part 402, as well as two further fins 40c, 40d, which only have an inner part 401. The device 20 furthermore has a shaft bracket 10, in which a propeller shaft 12 is mounted. The shaft bracket has a rear end 101 as well as a front end 102. As can be seen in FIG. 8A, the device 20 or in particular the fore-nozzle 30, respectively, is arranged significantly closer to the rear end 101 than to the front end 102. Viewed in their transverse expansion in travel direction of the vessel, the fins 40a, 40b, 40c, 40d are slightly shorter than the fore-nozzle 30, so that a piece of the fore-nozzle protrudes beyond each fin in the contact region between fins 40a, 40b, 40c, 40d and the fore-nozzle 30 in the front and in the rear direction. In contrast, viewed in travel direction of the vessel, the shaft bracket arms 11a, 11b are longer than the fore-nozzle, so that the shaft bracket arms 11a, 11b stick out forwards and backwards beyond the fore-nozzle (see in particular FIG. 8A). The fore-nozzle 30 from the illustration of FIGS. 8A and 8B consists of three separate nozzle segments 301, 302, 303, which are combined to form a circumferentially closed nozzle ring 30. The nozzle segment 301 is arranged between the shaft bracket arms 11a and 11b and is fastened thereto. With its one side, the nozzle segment 302 is connected to the shaft bracket arm 11b and with its other end it is connected to the further nozzle segment 303 on the joint 304. On the joint 304, the nozzle segment 303 is connected to the nozzle segment 302 and to the shaft bracket arm 11a with its other end.

Viewed in travel direction of the vessel, downstream from the device 20, a propeller 13 is provided, which is driven by the propeller shaft 12. The propeller 13 directly adjoins the rear end 101 of the shaft bracket 10. The fore-nozzle 30 has a smaller diameter than the propeller 13. For example, the diameter of the fore-nozzle can be less than 90%, preferably less than 75%, more preferably less than 60% of the propeller diameter. The fins, in particular the fins 40a, 40b (with inner and outer part 401, 402), have a smaller length than half of the propeller diameter. Viewed further downstream from the propeller 13 in travel direction of the vessel, a rudder 60 is provided. A skeg 52, which is fixedly connected to the hull 50, follows above the rudder 60. As can in particular be seen in FIG. 8A, the propeller 13 or the propeller hub thereof, respectively, is arranged at a certain distance $d_1$ to the rudder 60.

Figure 9A:
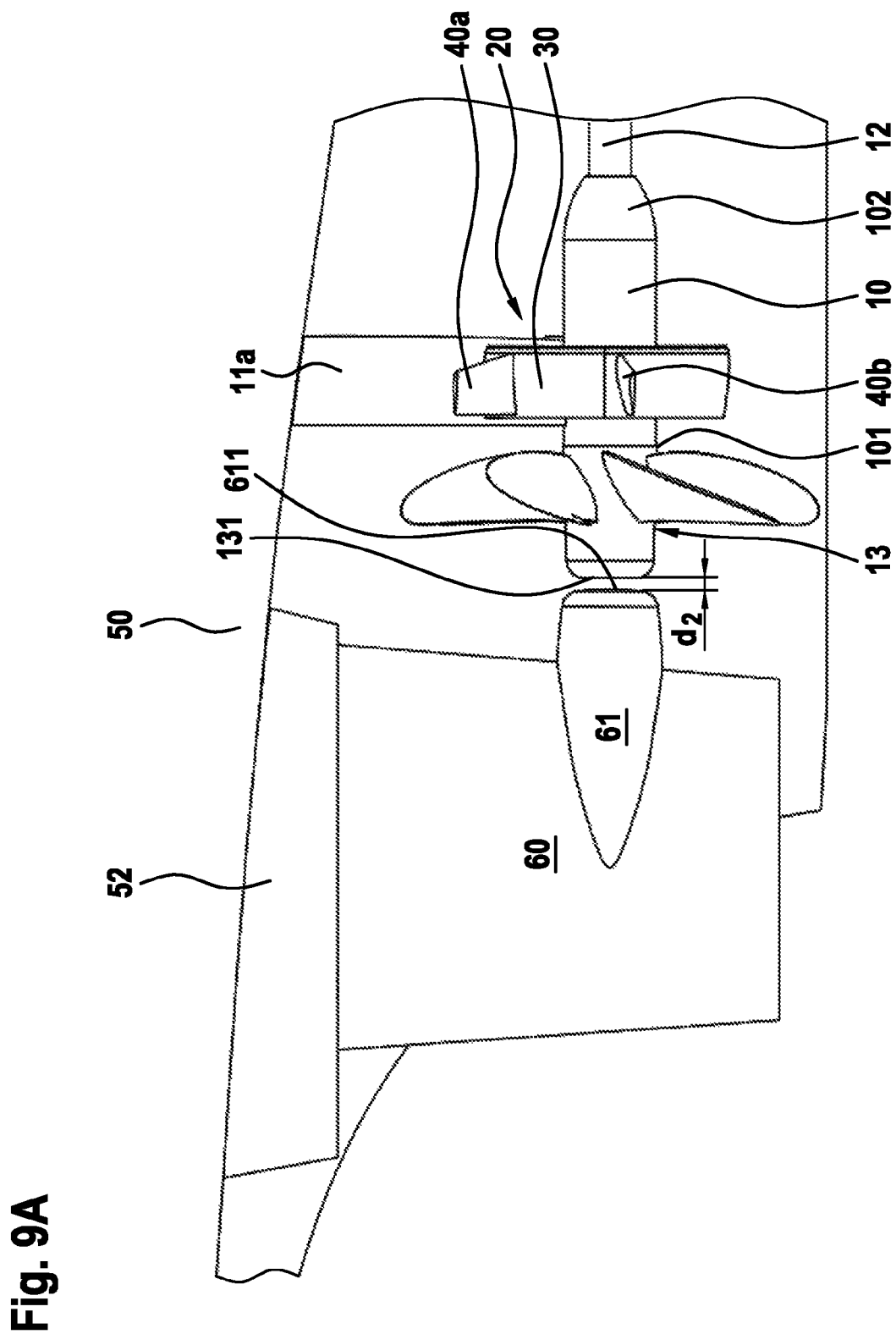
FIG. 9A shows the embodiment according to FIG. 8A with a rudder with a propulsion bulb.
Figure 9B:
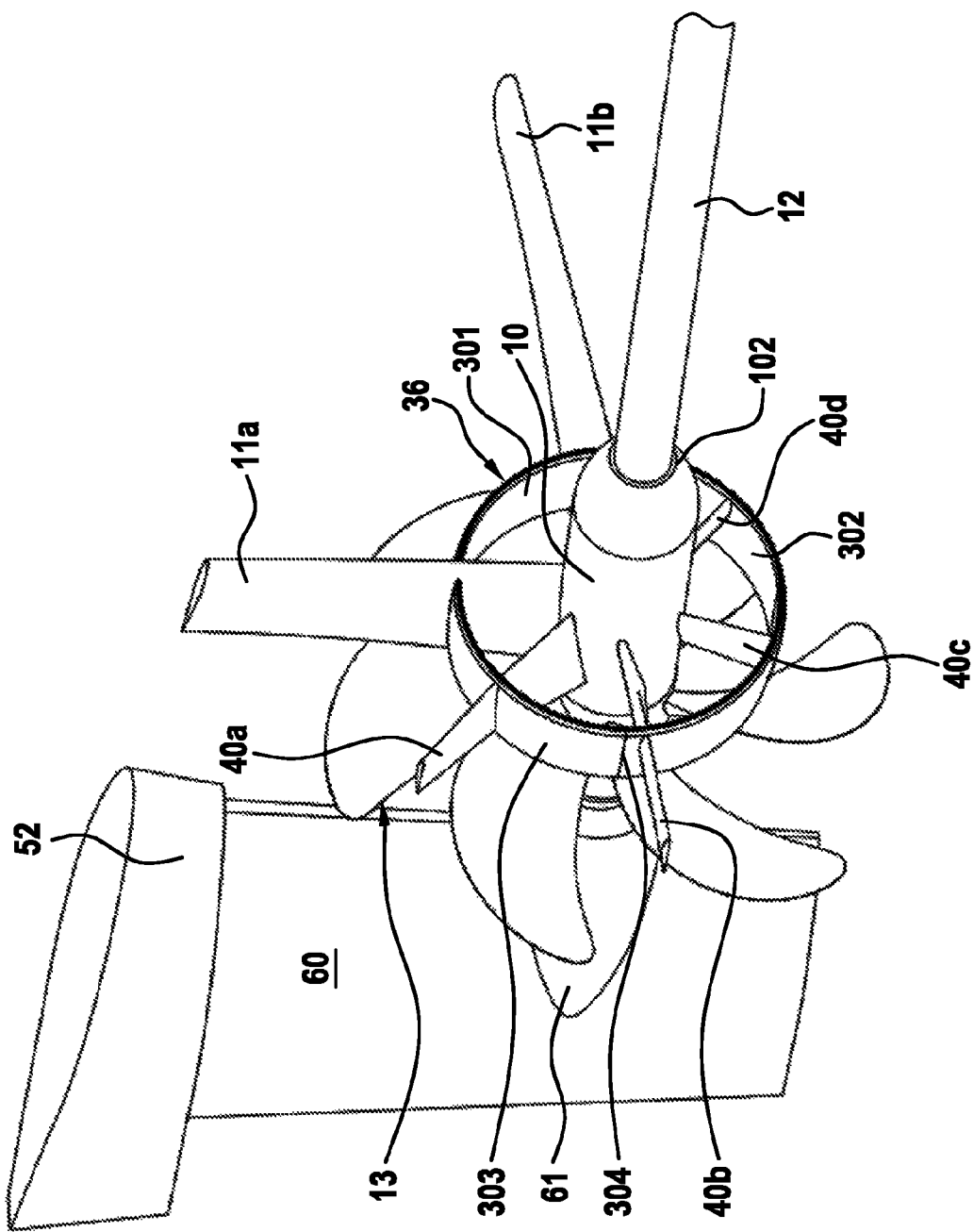
FIG. 9B shows the embodiment according to FIG. 9A from a perspective view at an incline from the front.

The embodiment according to FIGS. 9A and 9B is configured similarly to the embodiment from FIGS. 8A and 8B. In particular, the device 20 and the corresponding components, shaft bracket arms 11a, 11b, shaft bracket 10, fore-nozzle 30 as well as fins 40a, 40b, 40c, 40d are formed identically. The only difference between the embodiments according to FIGS. 9A and 9B on the one side and between FIGS. 8A and 8B on the other side is that in the case of the embodiment according to FIGS. 9A and 9B, the rudder 60 has a propulsion bulb 61. The distance $d_2$ between the leading edge 611 of the propulsion bulb 61 and the propeller hub 131 is significantly smaller than the distance $d_1$ in the embodiment according to FIGS. 8A and 8B without a propulsion bulb.

Figure 10A:
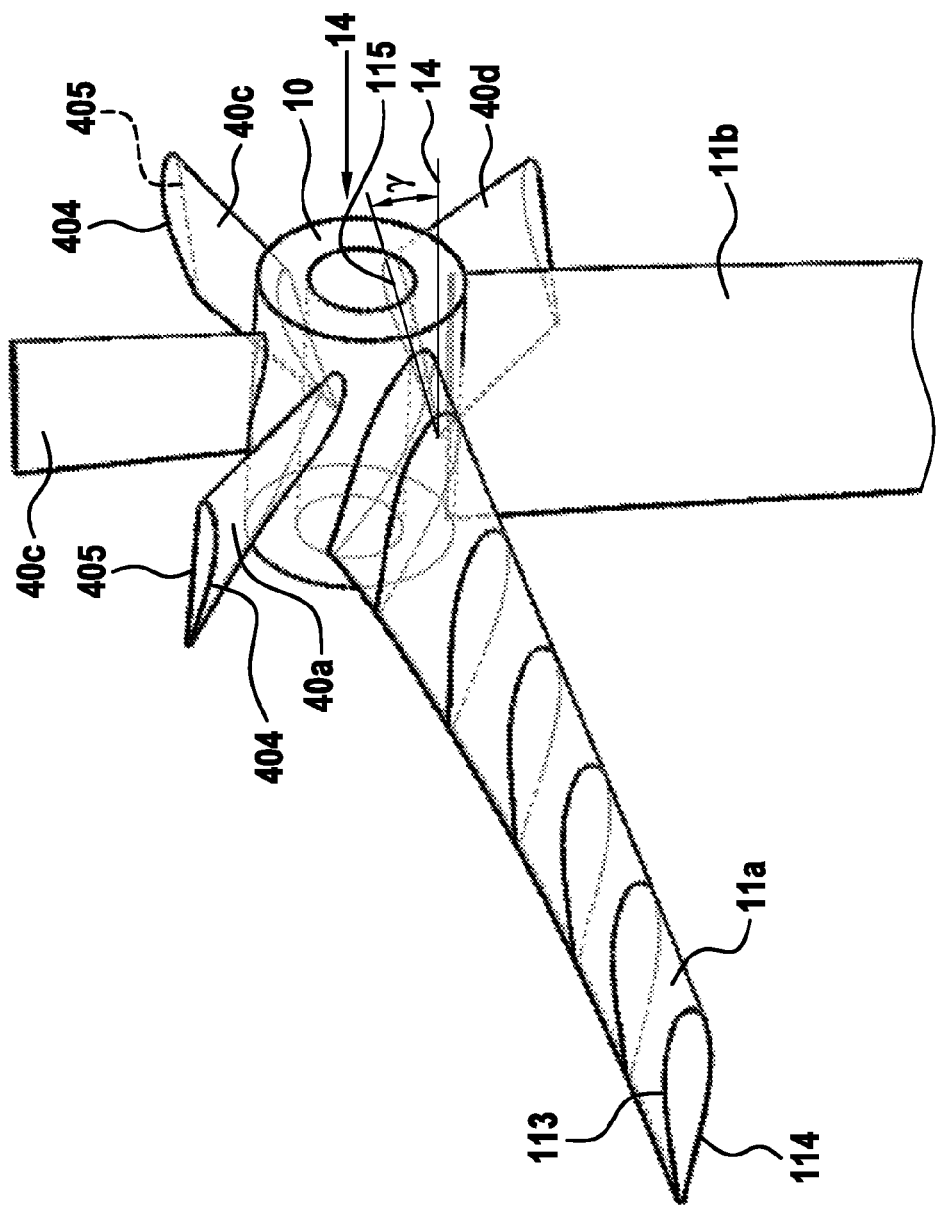
FIG. 10A shows a perspective view of a shaft bracket with fins and shaft bracket arms fastened thereto.
Figure 10B:
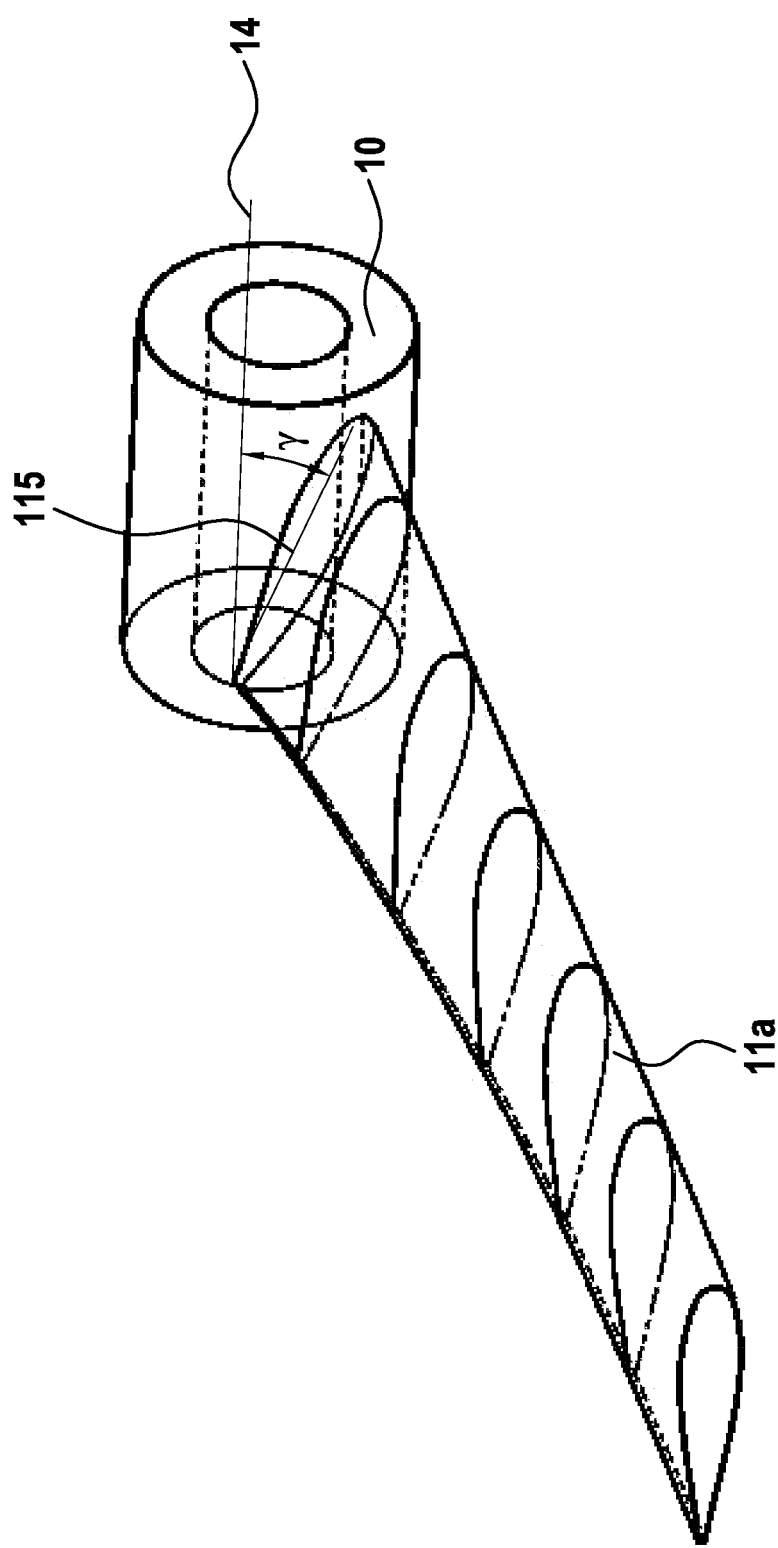
FIG. 10B shows the view from FIG. 10A comprising only one shaft bracket arm and without fins.

FIGS. 10A and 10B show an enlarged, perspective view of a shaft bracket 10. In the case of the illustration in FIG. 10A, two shaft bracket arms 11a, 11b as well as four fins 40a, 40b, 40c and 40d are illustrated, which are each fastened to the shaft bracket 10 with one of their ends. For the sake of clarity, further component parts or components, respectively, of the device have been omitted. In particular, a fore-nozzle has been omitted in the present illustration. The illustrations of FIG. 10A and FIG. 10b are perspective illustrations, wherein regions of the individual components, which are not visible, are illustrated with dashed lines. FIG. 10B shows the same view as FIG. 10A, wherein FIG. 10B only shows the shaft bracket 10a as well as the shaft bracket arm 11a, and wherein, for the sake of clarity, the further shaft bracket arm 11b as well as the fins 40a, 40b, 40c, 40d have been omitted. It can be seen from the view of FIG. 10A that the fins each have a hydrofoil profile with a rounded suction side 404 as well as a flat or flatter pressure side 405. It can also be seen that the shaft bracket arms 11a, 11b have a rounder or more curved suction side 113 as well as a flatter or flat pressure side 114. It can further be seen that the fins 40a, 40b, 40c, 40d as well as the shaft bracket arms 11a, 11b are formed so as to be entwined or twisted, respectively. It can further be seen that the shaft bracket arms 11a, 11b as well as the fins 40a, 40b 40c, 40d have an angle of attack as compared to the flow direction of the water 14. The angle of attack γ is thereby formed by the angle between the chord 115 of the shaft bracket arm profile or of the chord 406 of the fin profile, respectively, on the one side and the water flow direction 14 on the other side.

The invention claimed is:

1. An arrangement for multi screw vessels with external propeller shafts, comprising
    at least two shaft brackets for supporting the propeller shafts, each of the at least two shaft brackets having at least one shaft bracket arm for fastening the respective shaft bracket to the multi screw vessel; and
    at least two devices for reducing the drive power requirement of the multi screw vessel, wherein each device is assigned to one of the at least two shaft brackets, and wherein each of the at least two devices comprises at least one hydrofoil;
    wherein at least one shaft bracket arm of each shaft bracket is formed as a hydrofoil of the device, and wherein, in addition to the shaft bracket arms, no further hydrofoils are provided, or
    wherein each of the at least two devices comprises a fore-nozzle, and wherein, each one of the at least two devices comprises at least one fin, which is formed as a hydrofoil, wherein the at least one fin is arranged in the interior of the fore-nozzle and/or on the outside of the fore-nozzle.

2. The arrangement according to claim 1, wherein the at least one shaft bracket arm is arranged so as to be integrated in one of the at least two devices.

3. The arrangement according to claim 1, wherein each of the at least two devices is fastened to an A-bracket.

4. The arrangement according to claim 3, wherein the at least two devices are fastened to the half of the respective shaft bracket facing a propeller.

5. The arrangement according to claim 1, wherein the fore-nozzle of each device is fastened to at least one shaft bracket arm.

6. The arrangement according to claim 1, wherein each device comprises three shaft bracket arms.

7. The arrangement according to claim 1, wherein provision is made for 2 to 10.

8. The arrangement according to claim 1, wherein the at least one hydrofoil has an angle of attack ($\gamma$), of between >0° and 40° and/or wherein the at least one hydrofoil is formed so as to be twisted.

9. The arrangement according to claim 8, wherein a degree of twist and/or the angle of attack ($\gamma$) of the at least one hydrofoil in the region of the at least one hydrofoil, which faces the shaft bracket, is larger or smaller than in the remainder of the at least one hydrofoil.

10. The arrangement according to claim 1, wherein the at least one hydrofoil has different profile thicknesses and/or profile lengths, viewed in the longitudinal direction thereof, wherein in particular the region of the at least one hydrofoil facing the shaft bracket has a larger profile thickness than the remainder of the at least one hydrofoil, and/or wherein in particular the profile of the at least one hydrofoil tapers from its end facing the shaft bracket to its end facing away from the shaft bracket with reference to its profile thickness and/or its profile length.

11. The arrangement according to claim 1, wherein the arrangement further comprises at least two propellers, which are operatively connected to the propeller shafts, as well as at least two rudders, wherein each of the at least two rudders is assigned to one of the at least two propellers, and wherein the at least two rudders each have a propulsion bulb, which is arranged at a slight distance ($d_2$) downstream from the hub of the respective propeller.

12. A multi screw vessel with external propeller shafts, wherein the multi screw vessel comprises an arrangement for multi screw vessels with external propeller shafts, comprising
at least two shaft brackets for supporting the propeller shafts, wherein each of the at least two shaft brackets has at least one shaft bracket arm for fastening the respective shaft bracket to the multi screw vessel; and
at least two devices for reducing the drive power requirement of the multi screw vessel, wherein each device is assigned to one of the at least two shaft brackets, and wherein each of the at least two devices comprises at least one hydrofoil;
wherein at least one shaft bracket arm of each shaft bracket is formed as a hydrofoil of the device, and wherein, in addition to the shaft bracket arms, no further hydrofoils are provided, or
wherein each of the at least two devices comprises a fore-nozzle, and wherein, each one of the at least two devices comprises at least one fin, which is formed as a hydrofoil, wherein the at least one fin is arranged in the interior of the fore-nozzle and/or on the outside of the fore-nozzle.

13. A method for producing an arrangement for multi screw vessels with external propeller shafts, wherein at least two devices for reducing the drive power requirement of the vessels are provided, wherein each device comprises a fore-nozzle and at least one hydrofoil, wherein the at least one hydrofoil is arranged in the interior of the fore-nozzle and/or on the outside of the fore-nozzle, wherein the at least two devices are each arranged on and fastened to a shaft bracket of a propeller shaft of the multi screw vessel in such a manner that at least one shaft bracket arm of a shaft bracket are arranged so as to be integrated in one of the at least two devices.

14. The method according to claim 13, comprising the following steps:
a) providing at least two shaft bracket arms, which are each formed as a hydrofoil, and fastening the at least two shaft bracket arms with one shaft bracket arm end region to a shaft bracket, and with the other shaft bracket arm end region to the vessel's hull,
b) providing a fore-nozzle, which is open or closed across the circumference, wherein the fore-nozzle comprises at least two nozzle segments,
c) arranging a first nozzle segment between the at least two shaft bracket arms,
d) fastening each of the two end regions of the first nozzle segment to a first side of adjacent shaft bracket arms of the at least two shaft bracket arms, and
e) fastening at least one end region of a second nozzle segment to a second side of one of the at least two shaft bracket arms.

15. The method according to claim 14, comprising the following steps:
a1) providing fins, which are formed as hydrofoils, and fastening the fins with one end region to the shaft bracket,
b1) if applicable, providing through holes in one or a plurality of the nozzle segments, leading the fins through the through holes, and fastening the fins to the respective nozzle segment, and
b2) if applicable, fastening one or a plurality of fins to the exterior of one or a plurality of nozzle segments.

16. A method for producing an arrangement for multi screw vessels with external propeller shafts, wherein at least two devices for reducing the drive power requirement of the vessels are provided, wherein each device comprises at least one hydrofoil, wherein the at least two devices are each arranged and fastened to a shaft bracket of a propeller shaft of the multi screw vessel, wherein at least three shaft bracket arms are provided for each shaft bracket, which are each connected to the hull of the multi screw vessel with their one end, and which are fastened to the shaft bracket with their other end, wherein the at least three shaft bracket arms are each formed as hydrofoils of the device, wherein no further hydrofoils are provided in addition to the shaft bracket arms, wherein at each device a fore-nozzle is provided, which, together with the at least three shaft bracket arms, which are formed as hydrofoils, each form a device.

17. The arrangement according to claim 1, wherein each of the at least two shaft brackets has at least two shaft bracket arms.

18. The arrangement according to claim 5, wherein the fore-nozzle of each device is fastened to a plurality of shaft bracket arms.

19. The arrangement according to claim 7, wherein provision is made for 3 to 7 fins.

20. The arrangement according to claim 8, wherein angle of attack is between 3° and 20°.

* * * * *